US012488652B2

(12) United States Patent
Voloh et al.

(10) Patent No.: US 12,488,652 B2
(45) Date of Patent: Dec. 2, 2025

(54) INTEGRATED STAND FOR SUPPORTING ELECTRONIC GAMING MACHINE AND HOUSING ELECTRONIC GAMING COMPONENTS THEREOF

(71) Applicant: Aristocrat Technologies Australia Pty Limited, North Ryde (AU)

(72) Inventors: Noel Voloh, Sydney (AU); Martin Mirakhour, Castle Hill (AU); Calvin Kim, Baulkham Hills (AU)

(73) Assignee: Aristocrat Technologies Australia Pty Limited, North Ryde (AU)

(*) Notice: Subject to any disclaimer, the term of this patent is extended or adjusted under 35 U.S.C. 154(b) by 232 days.

(21) Appl. No.: 18/307,507

(22) Filed: Apr. 26, 2023

(65) Prior Publication Data

US 2023/0377410 A1 Nov. 23, 2023

Related U.S. Application Data

(60) Provisional application No. 63/344,232, filed on May 20, 2022.

(51) Int. Cl.
*A63F 9/24* (2006.01)
*G07F 17/32* (2006.01)

(52) U.S. Cl.
CPC ................................ *G07F 17/3216* (2013.01)

(58) Field of Classification Search
None
See application file for complete search history.

(56) References Cited

U.S. PATENT DOCUMENTS

| | | | | |
|---|---|---|---|---|
| 6,146,274 | A * | 11/2000 | Salour | G07F 9/06 194/350 |
| 6,474,758 | B1 * | 11/2002 | Hedrick | G07F 17/32 312/223.1 |
| D554,708 | S | 11/2007 | Gutknecht | |
| 8,596,604 | B2 | 12/2013 | Kubach | |
| D697,558 | S | 1/2014 | Myers | |
| 9,275,511 | B2 | 3/2016 | Vollmann | |
| 9,443,376 | B2 | 9/2016 | Vollmann | |
| D865,873 | S | 11/2019 | Lewis | |
| D890,849 | S | 7/2020 | Johnson | |
| 2004/0051249 | A1 * | 3/2004 | Seelig | G07F 17/32 273/143 R |
| 2004/0149866 | A1 * | 8/2004 | Boucher | G07F 17/3216 248/127 |
| 2006/0073900 | A1 * | 4/2006 | Cole | G07F 17/32 463/46 |
| 2010/0227694 | A1 | 9/2010 | Cole | |

(Continued)

FOREIGN PATENT DOCUMENTS

EM 0026238190001 1/2015

*Primary Examiner* — Sunit Pandya
(74) *Attorney, Agent, or Firm* — Armstrong Teasdale LLP

(57) ABSTRACT

An electronic gaming system includes an electronic gaming machine (EGM) and a stand coupled to the EGM. The EGM includes a cabinet that includes a cabinet base defining a notch therein. The stand includes a housing that defines an interior cavity and includes a housing cover. The cabinet is seated on the housing cover. The stand also includes a keeper bracket coupled to the housing cover. The keeper bracket is received within the notch to align the cabinet on the housing cover and restrain against tipping of the EGM relative to the stand.

20 Claims, 21 Drawing Sheets

(56) References Cited

U.S. PATENT DOCUMENTS

2011/0195775 A1* 8/2011 Wells .................. G07F 17/3258
463/47
2011/0315850 A1* 12/2011 Kubach .............. G07F 17/3216
29/428

* cited by examiner

INTEGRATED STAND FOR SUPPORTING ELECTRONIC GAMING MACHINE AND HOUSING ELECTRONIC GAMING COMPONENTS THEREOF

CROSS-REFERENCE TO RELATED APPLICATION

This application claims priority to U.S. Provisional Patent Application No. 63/344,232, filed May 20, 2022, the disclosure of which is hereby incorporated by reference herein in its entirety.

TECHNICAL FIELD

The field of disclosure relates generally to electronic gaming systems including an electronic gaming machine (EGM) supported on a stand and, more specifically, to an integrated stand for supporting an EGM and housing electronic accessory components thereof and electronic gaming systems including the integrated stand and the EGM.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

One aspect is an electronic gaming system that includes an electronic gaming machine (EGM) and a stand coupled to the EGM. The EGM includes a cabinet, the cabinet including a cabinet base defining a notch therein. The stand includes a housing defining an interior cavity, the housing including a housing cover, the cabinet being seated on the housing cover. The stand also includes a keeper bracket coupled to the housing cover. The keeper bracket is received within the notch to align the cabinet on the housing cover and restrain against tipping of the EGM relative to the stand.

Another aspect is a stand for supporting an electronic gaming machine (EGM) thereon. The stand includes a housing defining an interior cavity for receiving one or more electronic gaming components therein. The housing includes a cover for supporting the EGM, the cover defining at least one window extending therethrough to allow the one or more electronic gaming components to be communicatively coupled to one or more internal components provided within the EGM via communication wiring. The stand also includes a keeper bracket including a first portion coupled to the cover and a cantilevered second portion that is raised relative to the first portion. The second portion is sized and shaped to be received within a corresponding notch of the EGM to align the EGM on the cover and restrain against tipping of the EGM relative to the stand.

Another aspect is a method of assembling an electronic gaming system including an electronic gaming machine (EGM) and a stand. The EGM includes a cabinet having a cabinet base defining a notch therein, and a stand including a housing defining an interior cavity, the housing including a housing cover. The method includes coupling a keeper bracket to the housing cover; positioning the cabinet on the housing cover; and inserting the keeper bracket into the notch to align the cabinet on the housing cover and restrain against tipping of the EGM relative to the stand.

BRIEF DESCRIPTION OF THE DRAWINGS

Corresponding reference characters indicate corresponding parts throughout the drawings.

DETAILED DESCRIPTION

Figure 1:
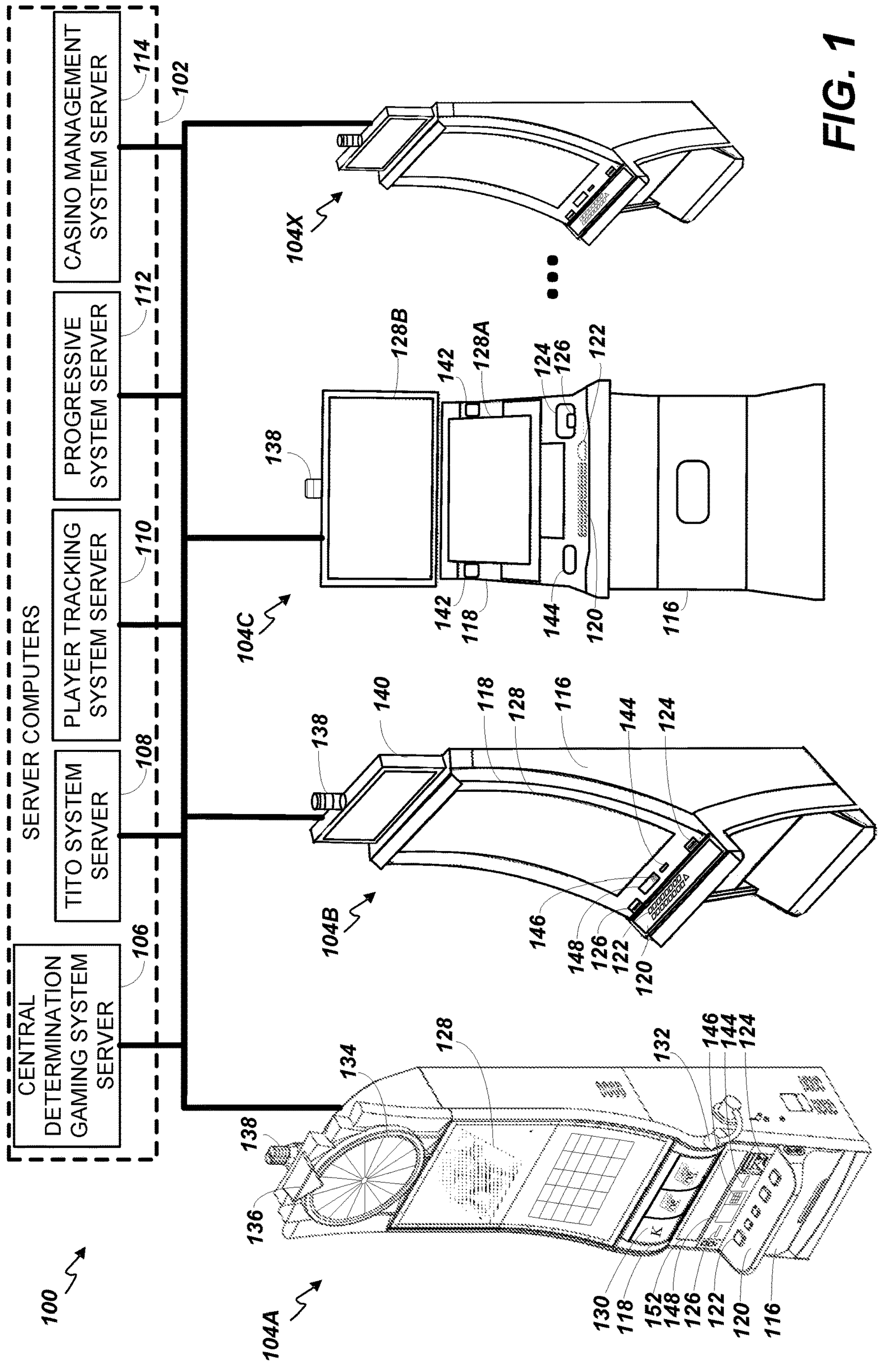
FIG. 1 is an exemplary diagram showing several EGMs networked with various gaming related servers.

Known electronic gaming machines (EGMs) include a cabinet that is typically supported on a stand. The stand elevates the EGM such that a display screen of the EGM is at a suitable height for a player when using the EGM. Elevating the EGM on a stand creates the opportunity for the EGM to become off-balanced and tip off the stand, thereby creating a potential hazard for players in a vicinity of the EGM and a risk that the EGM will be damaged or destroyed by falling off the stand and impacting a ground surface (e.g., a casino floor). Some known stands may also provide an enclosure that houses electrical and communication wiring for electronic gaming components of the EGM. The electronic gaming components for operating the EGM are typically internal to (e.g., positioned within the cabinet of) the EGM, which increases the size and footprint of the EGM. It would be desirable, therefore, to house at least some of the electronic gaming components within the stand to facilitate reducing the size and footprint of the EGM. However, this presents several challenges. For example, certain gaming regulatory requirements exist that require electronic gaming components of an EGM must be attached to and/or provided within a cabinet of an EGM or a structure attached to a cabinet of an EGM. Moreover, the electronic gaming components are susceptible to overheating during operation of the EGM, and adequate ventilation and/or cooling within the stand must be provided to mitigate thermally induced damage to the components. A need exists, therefore, for a stand for supporting an EGM that addresses some or all of the above-described problems and challenges.

Embodiments of the present disclosure include an electronic gaming system that includes an EGM and a stand coupled to the EGM for supporting the EGM. The stand is both mechanically and electrically integrated with the EGM. The term "mechanically integrated," as used to describe the stand and the EGM, means that the stand and the EGM are joined to one another by mechanical means. The stand may be mechanically integrated with the EGM, for example, by including interlocking features (e.g., a keeper bracket) for engaging the cabinet to align the EGM and restrain against tipping of the EGM on the stand in addition to and/or alternative to other tooling and mechanical elements (e.g., fasteners) used to secure the EGM to the stand. The term "electrically integrated," used to describe the stand and the EGM, means that the stand and the EGM each house computer hardware devices that are coupled in communication and used to operate the EGM. For example, the stand may be electrically integrated with the EGM by housing certain electronic gaming components (e.g., a media player, a multiport network switch, a modem, a player tracking device, or any other suitable computer hardware device) for operating the EGM within an interior cavity of the stand. The electronic gaming components of the EGM housed within the stand are coupled in communication with internal components positioned within the cabinet of the EGM (e.g., a game controller), for example, by communication wiring that is run between the stand and the EGM. Electrical integration between the stand and the EGM is further facilitated by various security features, for example, a selectively lockable access door and a lock-out security switch for alerting the EGM when a door of the stand is opened. Moreover, providing the security features of the stand in conjunction with the mechanical integration between the stand and the EGM facilitates electrically integrating the stand and the EGM in compliance with certain gaming regulatory requirements, which require that electronic components of a gaming system be attached to and/or provided within a cabinet of an EGM or a structure attached to a cabinet of an EGM.

The stand may include additional elements and features that further facilitate mechanical and/or electrical integration between the stand and the EGM and/or provide other advantages. For example, the stand may be suitably dimensioned (e.g., sized and shaped) to provide a smooth transition between the stand and a cabinet of the EGM and/or to elevate the EGM such that a display screen of the EGM is at an ergonomically suitable height for a player when using the EGM. Moreover, the stand may provide a compact and secure housing for storing certain electronic gaming components of the electronic gaming system and facilitates reducing the overall footprint of the electronic gaming system. For example, because electronic gaming components are stored in the stand, a size (e.g., width) of the cabinet of the EGM may be reduced compared to EGMs that house these electronic gaming components within the cabinet of the EGM. The reduced size of the EGM reduces a floor footprint of the electronic gaming system and/or improves stability of the gaming system by allowing for a reduced height and/or lower center of mass, making the gaming system less prone to tipping, for example. The reduced gaming system footprint provides certain benefits to casino operators who are required, in some cases by government regulations, to control an amount of floorspace used within the casino for EGMs. Moreover, the stand may also include balancing features, for example, feet that extend a suitable length outward from a base of the stand to facilitate improving stability of the gaming system. The stand may also include one or more cooling features, such as vent openings defined in the housing and a cooling fan for directing ambient air into the stand, which promote a flow of air through the interior cavity of the stand. The circulation of airflow into and out of the stand provides convective cooling of electronic gaming components housed within the stand to reduce overheating or other damage (e.g., thermally induced damage) to the gaming components. Further, the stand may include modular features that facilitate quick, easy, and efficient installation, servicing, and/or removal of the electronic gaming components housed therein. For example, a door of the stand may be removably coupled to the housing via door flaps that enable the door to be moved between an open and closed position without a hinge connection and/or enable the door to be removed from the housing without the need for tooling. Moreover, other components of the stand (e.g., an interior platform for supporting the electronic gaming components housed within the stand) may be include quick-connect features to facilitate quick, easy, and efficient assembly and customization of the stand.

The stand described herein thereby provides technical improvements and technical effects over known electronic gaming systems that include stands used to support and elevate EGMs including, for example: (a) reduced sizing of an EGM cabinet by offloading certain electronic components in communication with the EGM into the stand of the gaming system; (b) improved stability of a gaming system provided by lowering a center of mass of the gaming system; (c) improved stability of the EGM during installation on a stand provided by engagement between the keeper bracket on the stand and the notch defined in the EGM; (d) compliance with certain known gaming regulatory requirements, which require that certain electronic components of a gaming system be attached to and/or provided within a cabinet of an EGM or a structure attached to a cabinet of an EGM; (e) reduced floor footprint of a gaming system; (f) improved security to a stand of an EGM by providing communication between a door switch on the stand and the game controller in a cabinet of the EGM; g) improved cooling to electronic gaming components housed within the stand to reduce overheating or other damage (e.g., thermally induced damage) to the gaming components; and/or h) enable quick, easy, and efficient assembly of the EGM on the stand and/or installation, servicing, and/or removal of the electronic gaming components housed within the stand. Other technical improvements and technical effects may exist and will become apparent as the description of the example embodiments proceeds.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
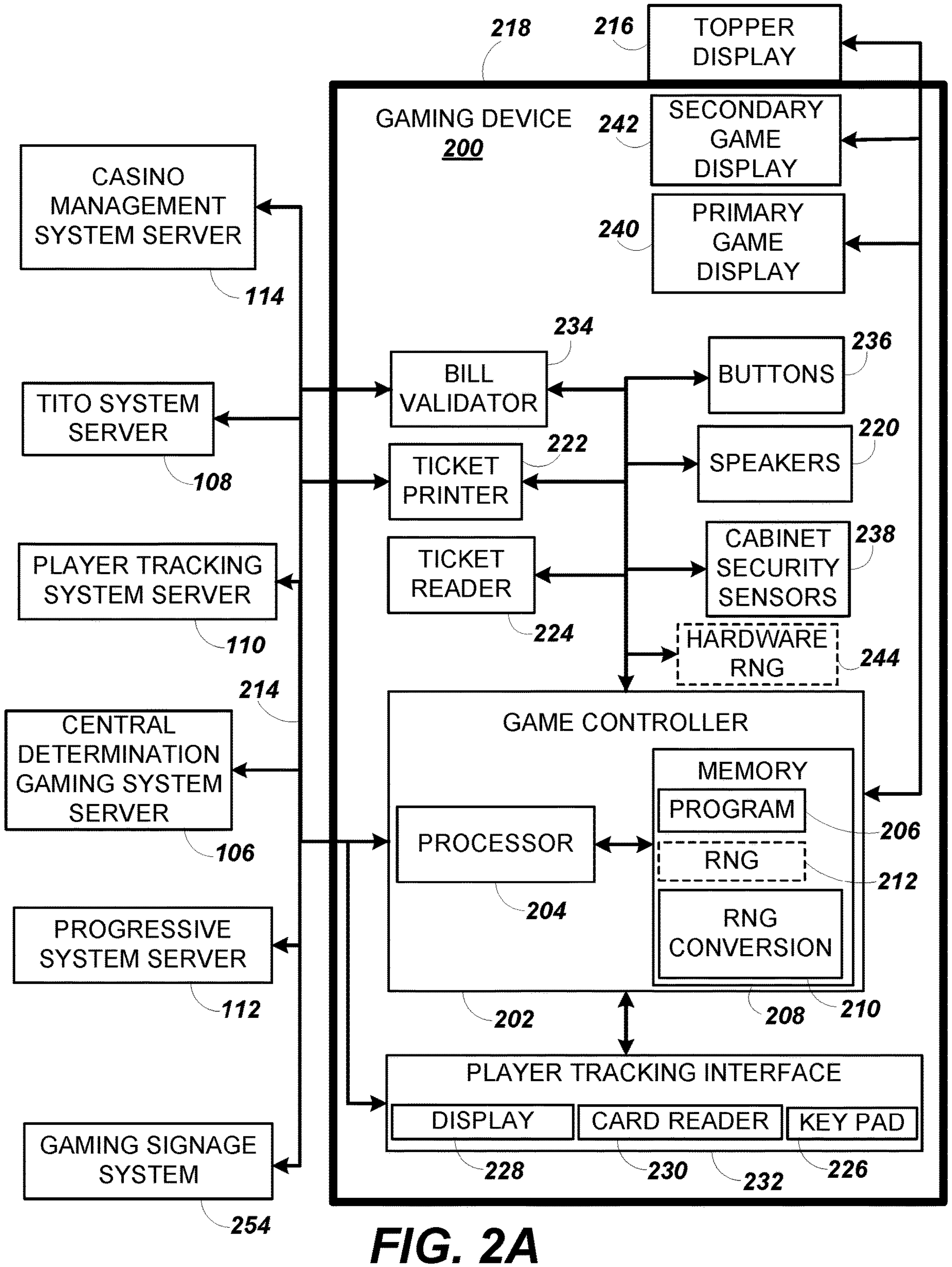
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
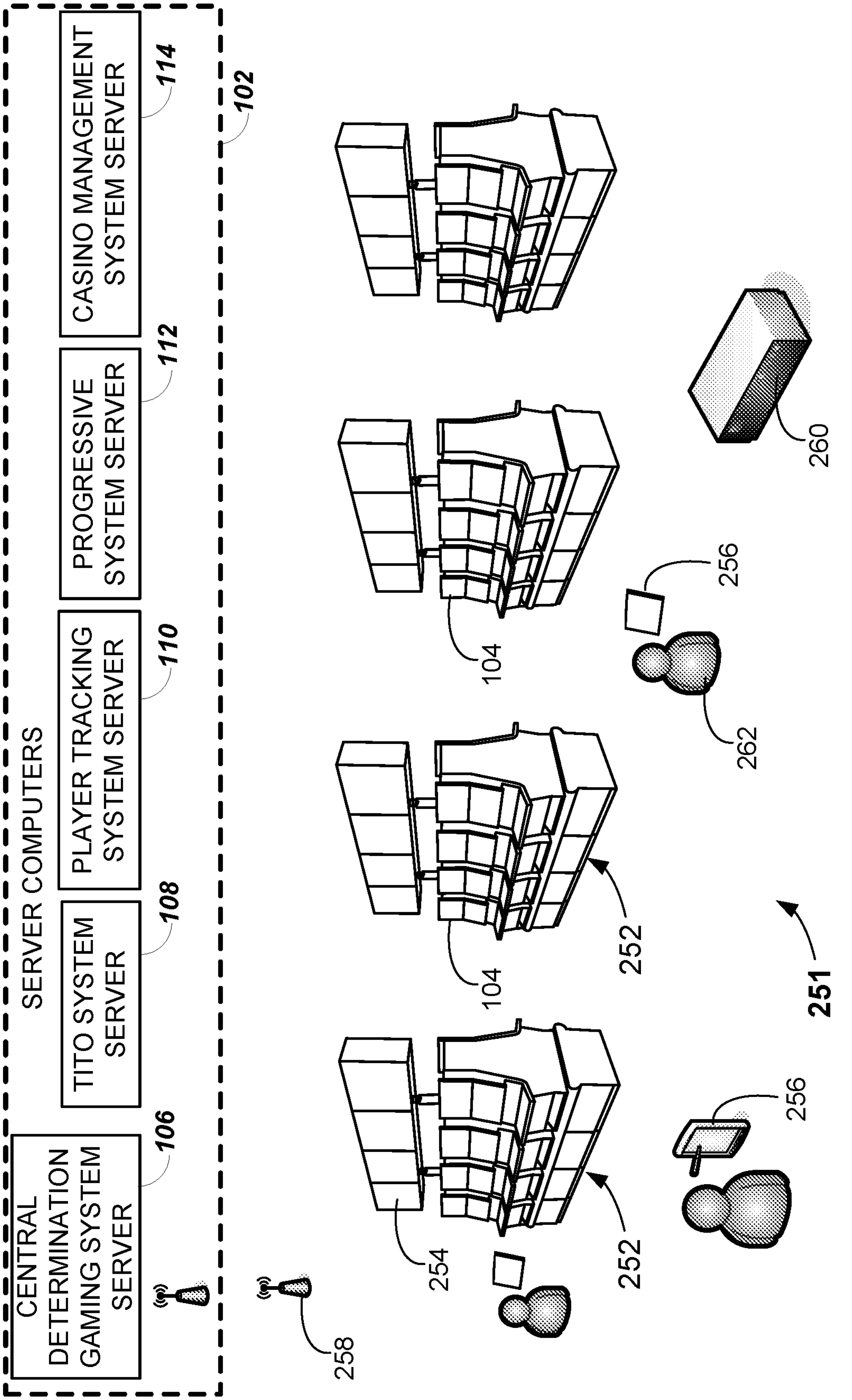
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
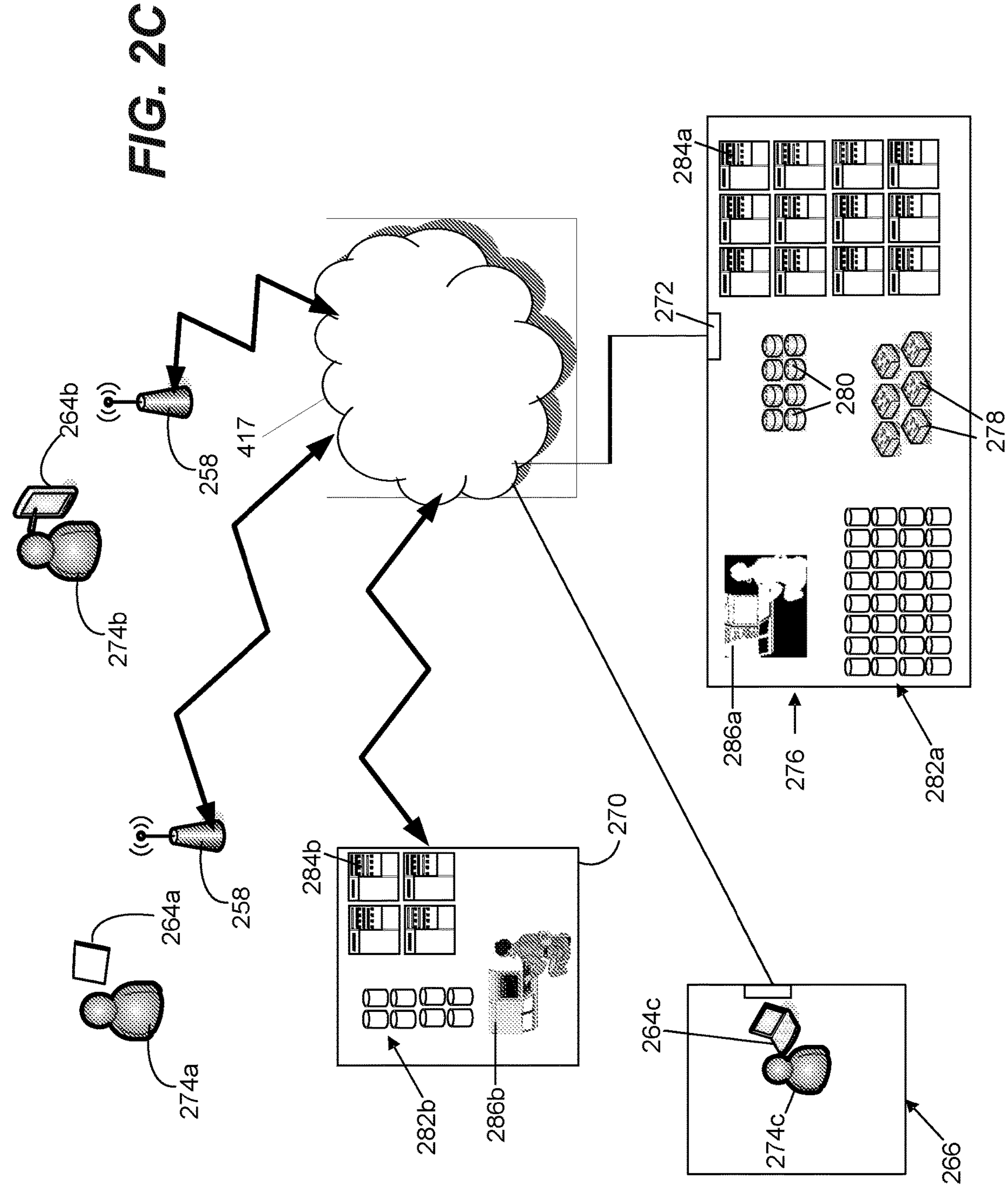
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
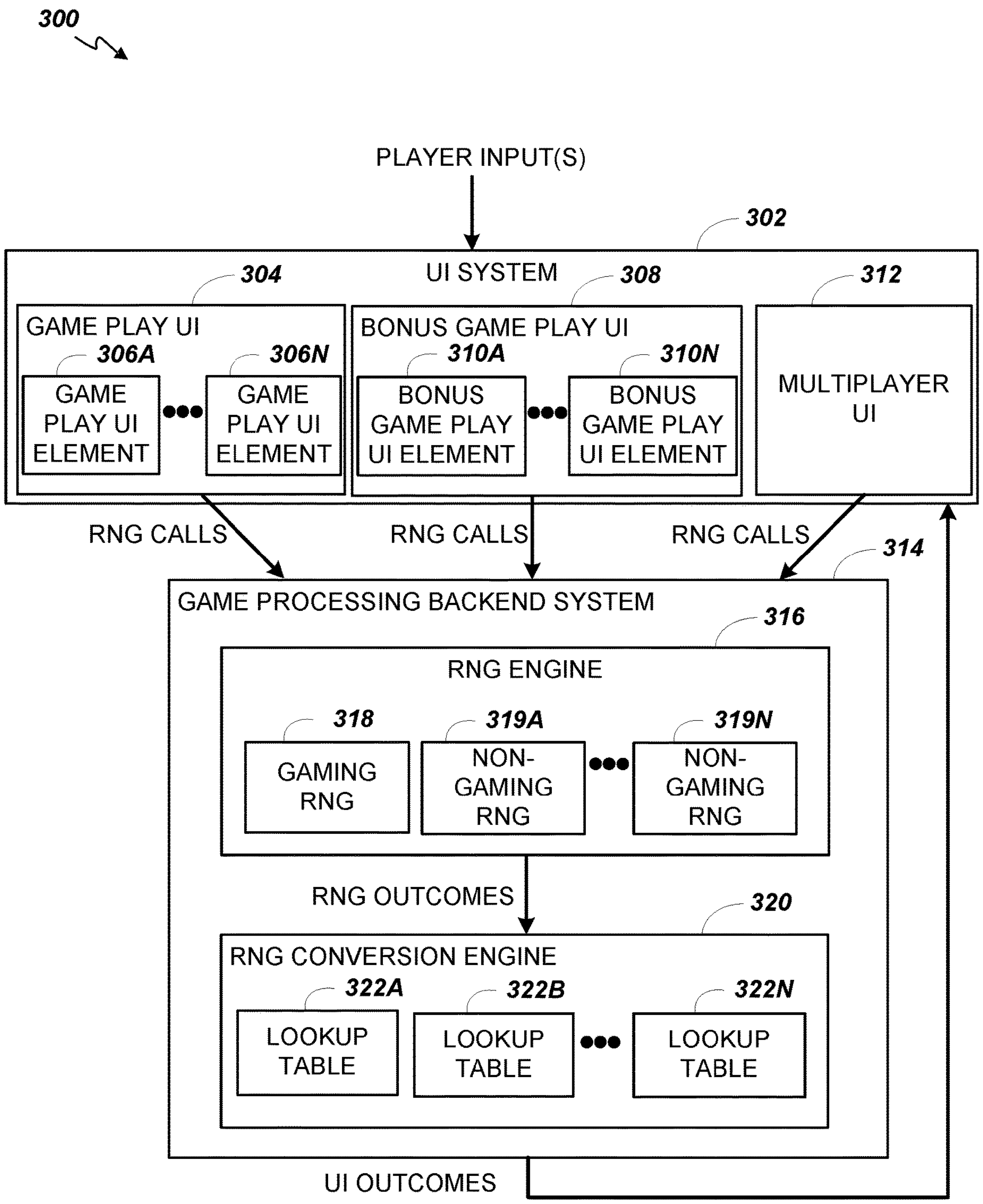
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
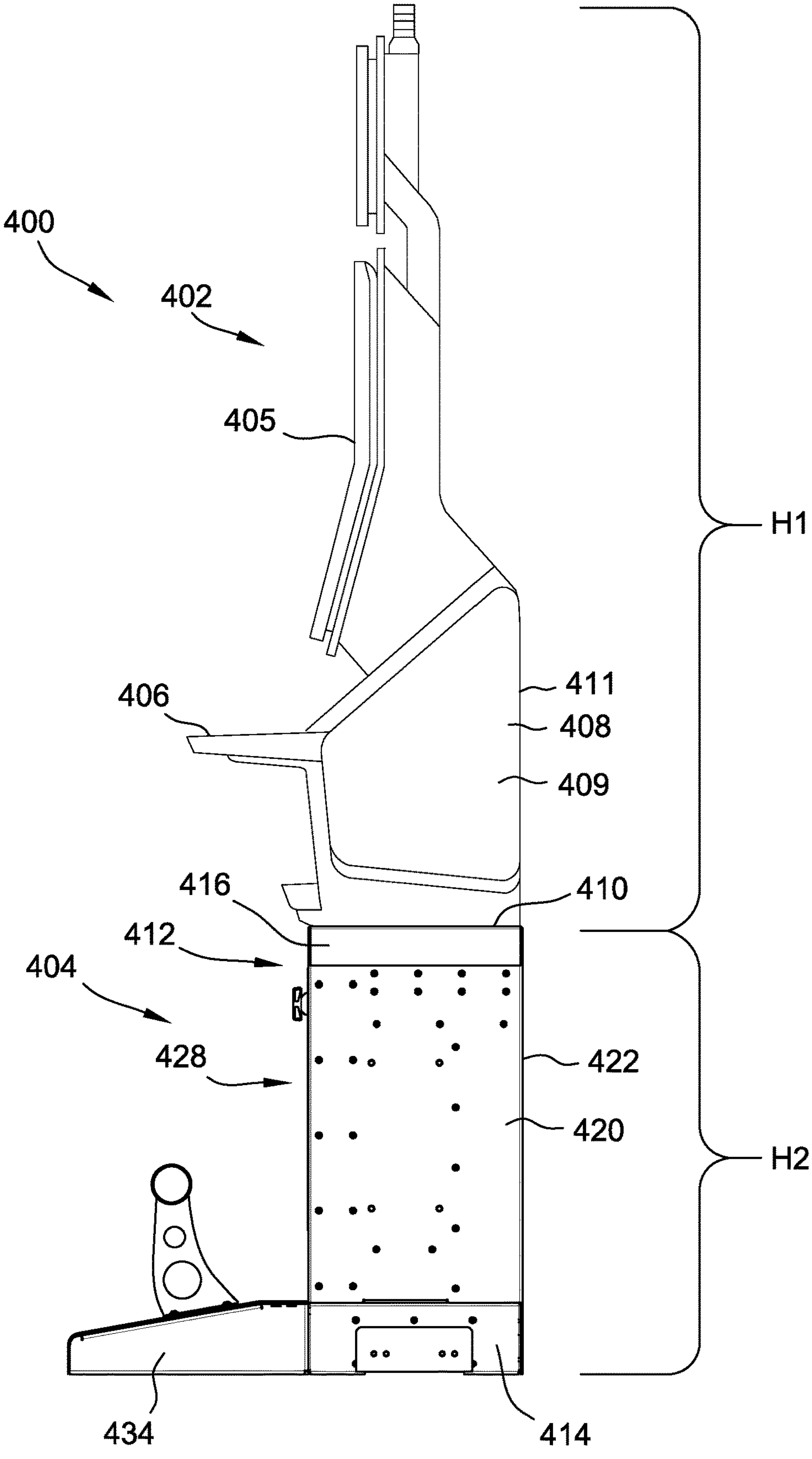
FIG. 4 is a side view of an electronic gaming system that includes an electronic gaming machine supported by a stand of the present disclosure.

FIG. 4 is a side view of an example electronic gaming system 400. The electronic gaming system 400 includes an electronic gaming machine (EGM) 402 that is coupled to and supported on a stand 404. As described in further detail herein, when the electronic gaming system 400 is assembled, the EGM 402 and the stand 404 are mechanically and electrically integrated such that the assembled electronic gaming system 400 may itself be referred to as an electronic gaming machine or gaming device. For example, the EGM 402 and the stand 404 may each house one or more computer hardware devices that are coupled in communication for operation of the electronic gaming system 400. The electronic gaming system 400 may be any suitable gaming device and may in some embodiments be similar to (e.g., include similar features and components as) any one of gaming devices 104A-104X or the gaming device 200, described above with respect to FIGS. 1 and 2A. In some embodiments, the EGM 402 and the stand 404 may be mechanically but not electrically integrated, such that the EGM 402 houses a substantial entirety of the computer hardware devices for operation of the electronic gaming system 400 and the stand 404 coupled to the EGM 402 may only house electrical and/or communication wiring for the devices housed in the EGM 402.

The EGM 402 is positionable on and couplable to the stand 404. When the EGM 402 is positioned on the stand 404, the EGM 402 extends a first height $H_1$ above the stand 404. The EGM 402 is removably couplable to stand 404 to allow for coupling a plurality of EGMs 402 to a plurality of similarly configured stands 404. The EGM 402 includes a display 405 for presenting an electronic game to a player, a button deck 406, and a cabinet 408. The cabinet 408 includes a cabinet base 410 which is positionable on stand 404. As described in greater detail below, the cabinet base 410 and the stand 404 include corresponding interlocking features that facilitate aligning the cabinet 408 on the stand 404 and restraining against tipping of the EGM 402 on the stand 404. The cabinet base 410 supports the display 405, the button deck 406, and the cabinet 408 vertically above the stand 404.

The cabinet 408 houses internal components of the EGM 402. The internal components housed in the cabinet 408 may include primary and/or auxiliary computer hardware devices for operating the EGM 402 (e.g., for controlling the electronic game presented on the display 405). The internal components housed in the cabinet 408 may include, for example, any of the components described above for the gaming device 200 with reference to FIG. 2A. For example, the cabinet 408 may house the game controller 202, the one or more processors 204, the memory 208 that may include one or more game programs 206, the RNG conversion engine 210, and/or the RNG 212. The EGM 402 may additionally and/or alternatively include and/or house (e.g., within cabinet 408) one or more of the components 220-242, described above for the gaming device 200 with reference to FIG. 2A.

Figure 5:
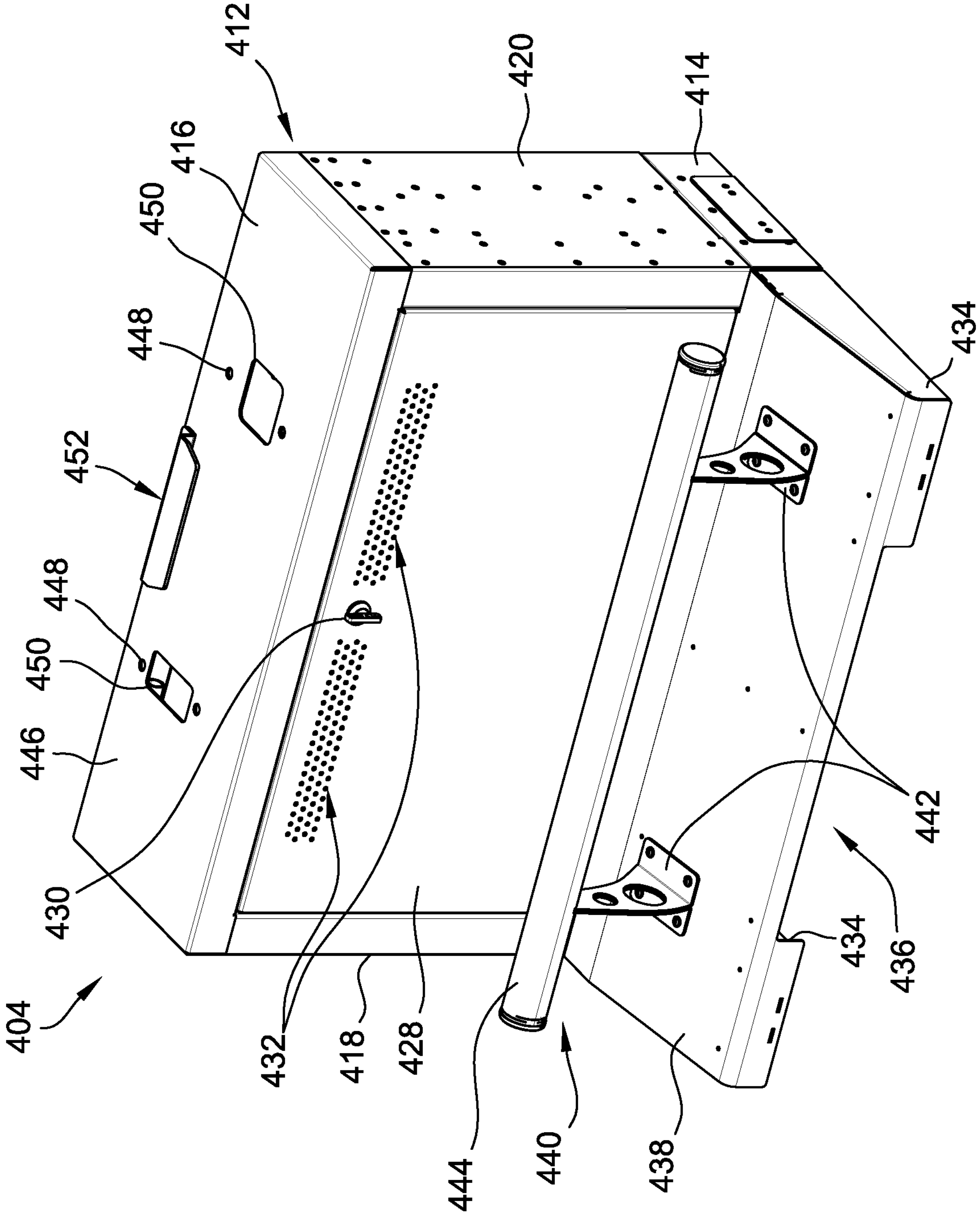
FIG. 5 is a front perspective view of the stand shown in FIG. 4.
Figure 6:
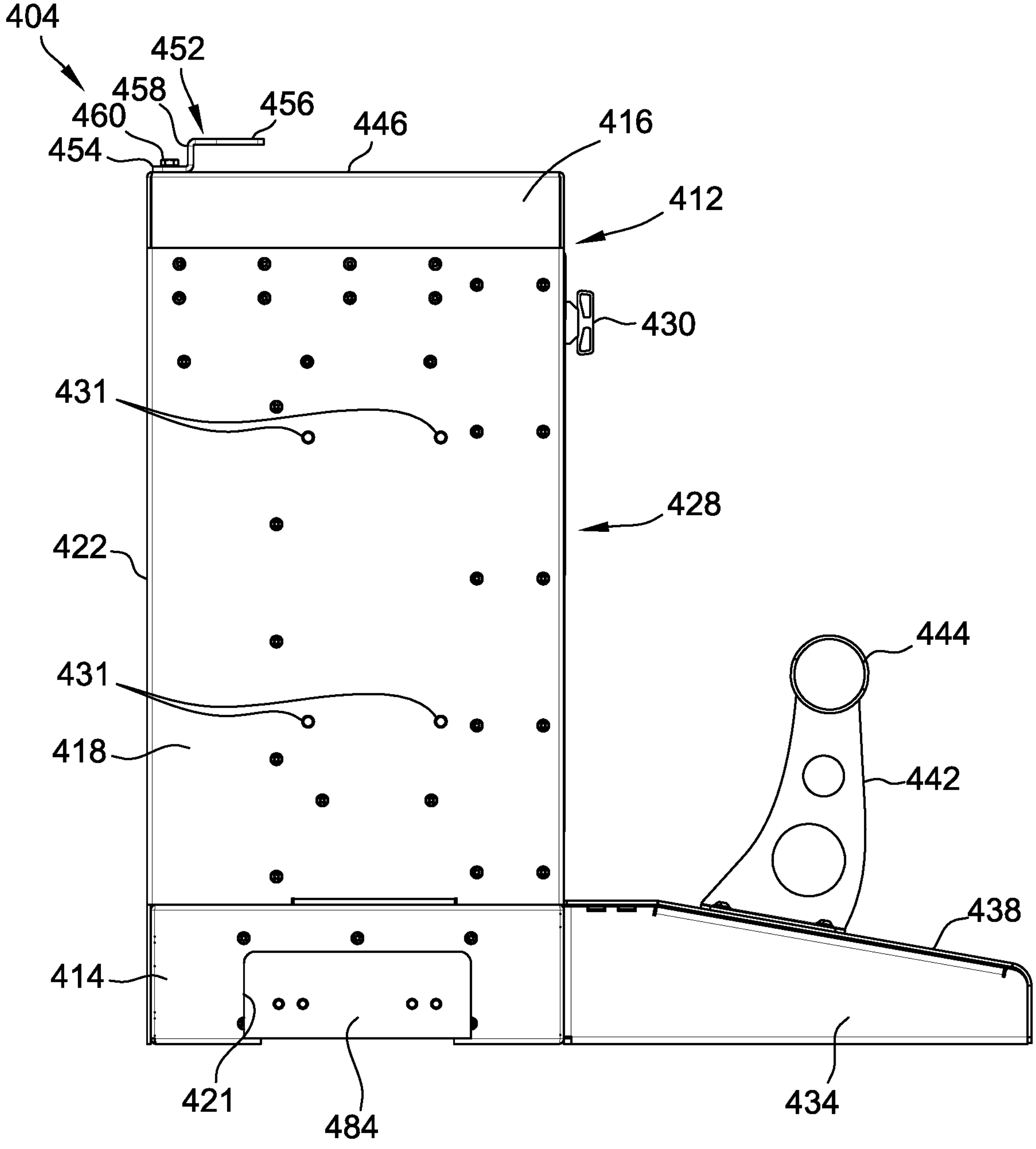
FIG. 6 is a left side view of the stand.
Figure 7:
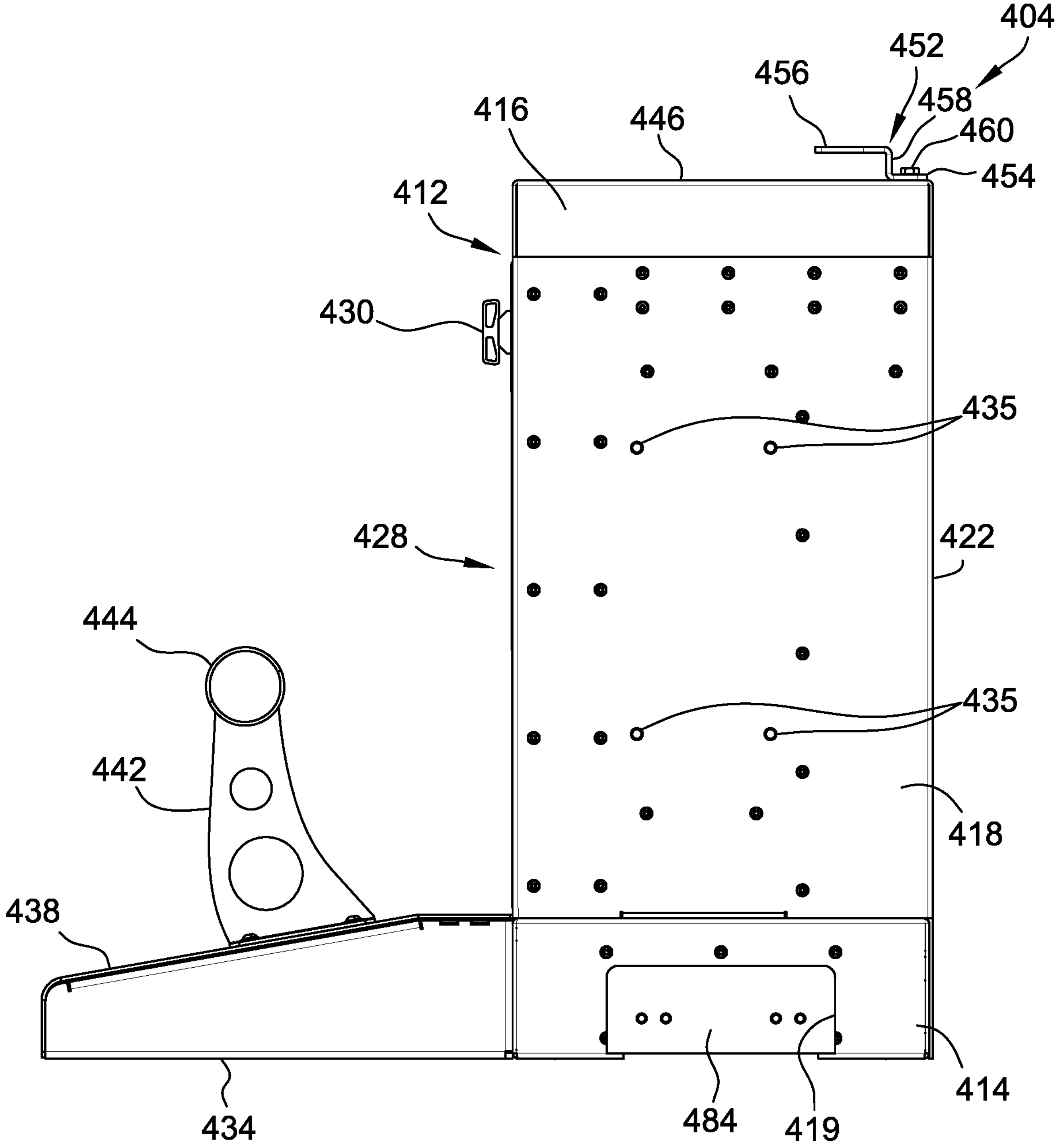
FIG. 7 is a right side view of the stand.
Figure 8:
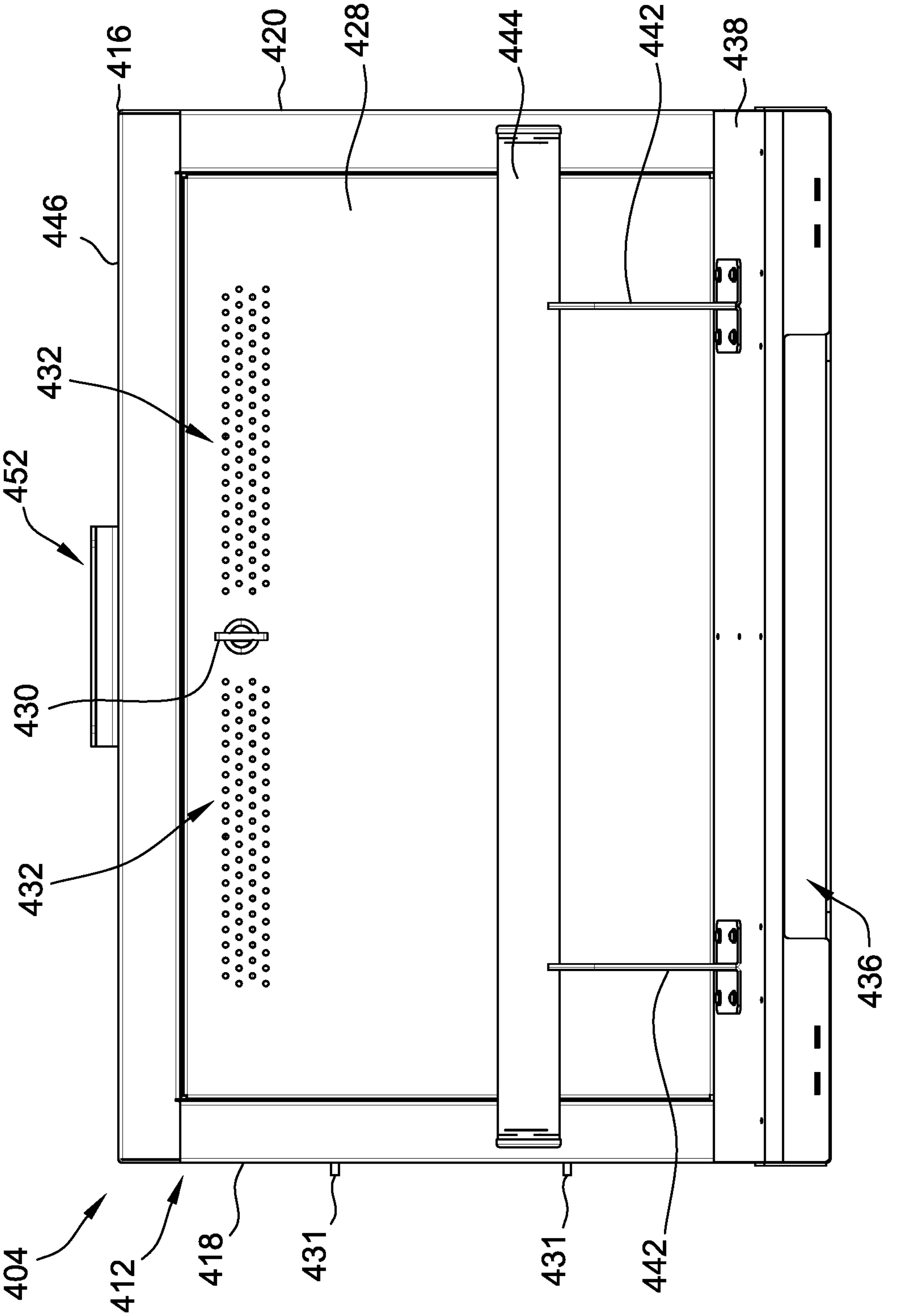
FIG. 8 is a front view of the stand.
Figure 9:
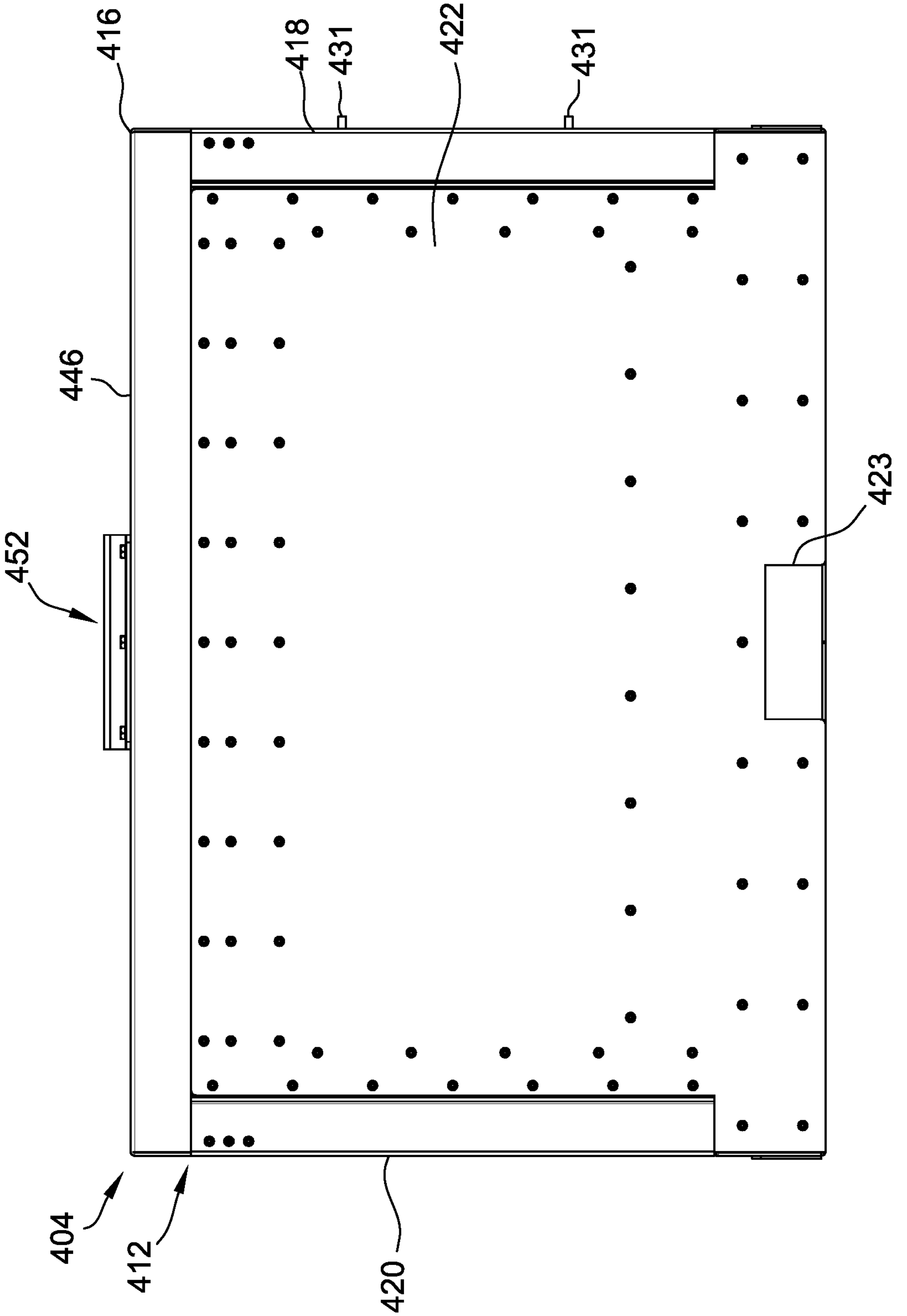
FIG. 9 is a rear view of the stand.
Figure 10:
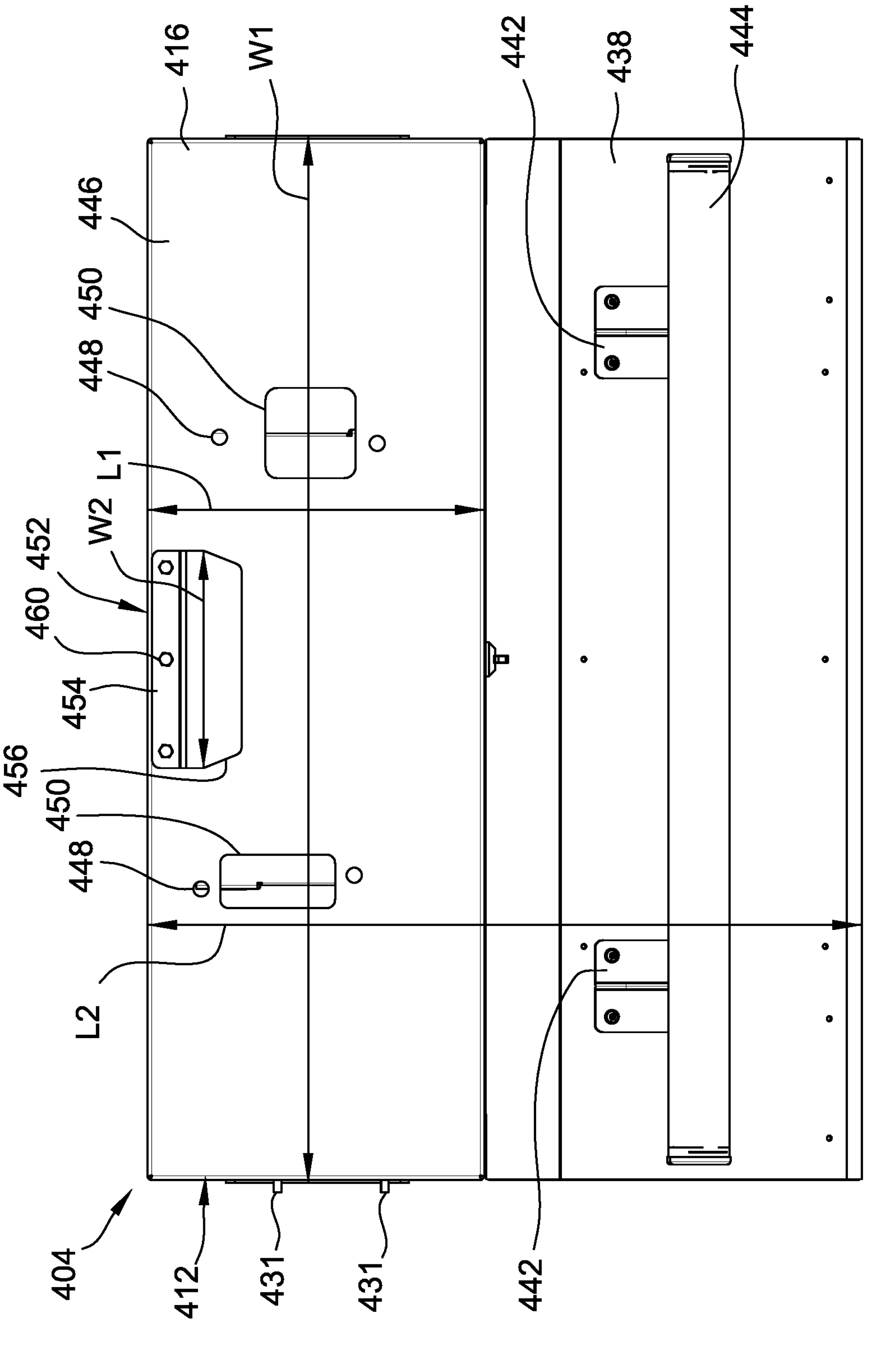
FIG. 10 is a top plan view of the stand.
Figure 11:
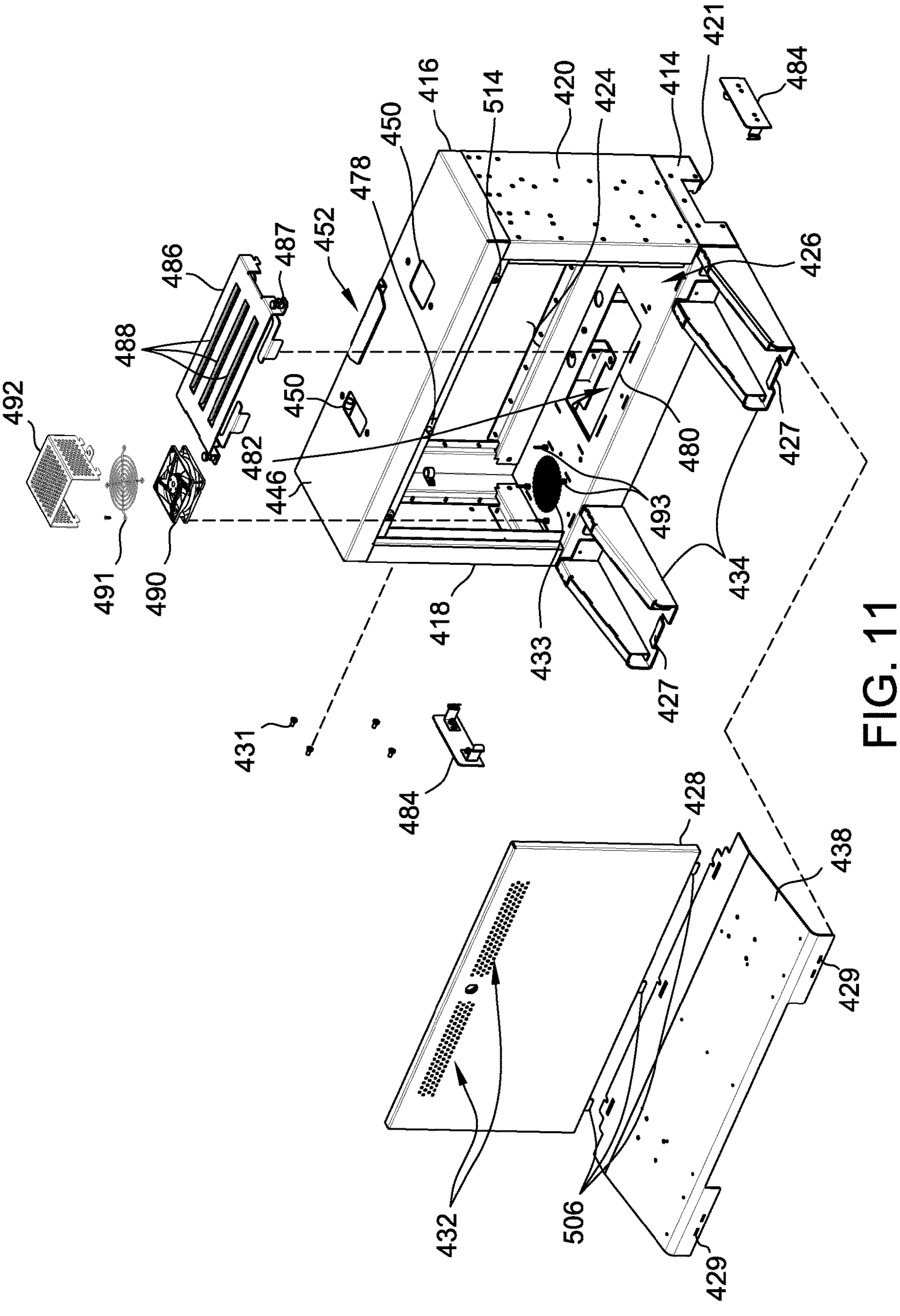
FIG. 11 is an exploded view of the stand, depicting internal components thereof.

The example stand 404 will now be described with additional reference to FIGS. 5-11 which depict various additional views of the stand 404 shown in FIG. 4. FIG. 5 is a front perspective view of the stand 404. FIG. 6 is a left side view of the stand 404. FIG. 7 is a right side view of the stand 404. FIG. 8 is a front view of the stand 404. FIG. 9 is a rear view of the stand 404. FIG. 10 is a top plan view of the stand 404. FIG. 11 is an exploded view of the stand 404 depicting internal components thereof.

The stand 404 includes a housing 412 defining an interior cavity 424 (shown in FIG. 11) of the stand 404. The housing 412 also defines a primary exterior shape of the stand 404. The shape of the housing 412 may be selected to suitably complement a shape of the cabinet 408 and/or the cabinet base 410 of the EGM 402 to provide a smooth transition between the stand 404 and the EGM 402. In the illustrated example, the housing 412 is box-shaped. In other examples, the housing 412 may have any suitable shape to complement a shape of the cabinet 408 and/or the cabinet base 410, and/or to provide any desired ornamental appearance of the stand 404.

The housing 412 includes a base 414, a cover 416, a left side panel 418, an opposing right side panel 420, and a rear panel 422. The base 414 defines a bottom of the housing 412 and the cover 416 defines a top of the housing 412. When the EGM 402 is positioned on the stand 404, as shown in FIG. 4, the cabinet base 410 contacts the cover 416 and is seated thereon. The side panels 418, 420 and the rear panel 422 extend vertically between the base 414 and the cover 416. The panels 418, 420, 422 respectively define closed sides or ends of the housing 412. Together, the base 414, the cover 416, the side panels 418, 420, and the rear panel 422 surround and define the interior cavity 424. A front opening 426 (shown in FIG. 11) is defined in the housing 412 and extends between the base 414 and the cover 416 and between the side panels 418, 420. The front opening 426 allows access to the interior cavity 424.

The stand 404 also includes an access door 428 coupled to the housing 412. The access door 428 extends across the front opening 426 and encloses the interior cavity 424 and limits access thereto. As described in further detail below, the access door 428 is movable between an open position and a closed position to selectively provide access to the interior cavity 424. The access door 428 includes a lock 430 (e.g., a keyed cam lock) that secures the access door 428 in the closed position to limit or prevent tampering with electronic gaming components (e.g., components 470 shown in FIG. 13) housed within the interior cavity 424. The access door 428 and includes a plurality of vent outlets 432 (e.g., a plurality of through-holes) defined therein and extending therethrough which promote air circulation within the interior cavity 424 for cooling electronic gaming components housed within the interior cavity, as described in further detail below. In other examples, the vent outlets 432 may additionally and/or alternatively extend through the housing 412 at any suitable location (e.g., on one or more of the panels 418, 420, 422) to promote air circulation within the interior cavity 424.

The base 414, the cover 416, the side panels 418, 420 and the rear panel 422 are supported and joined together by internal structural supports (not labeled) of the housing 412. In the example stand 404, the housing 412 includes four vertical supports coupled to and extending vertically above the base 414 at respective corners of the base 414. The housing 412 also includes horizontal supports coupled to and extending between each pair of adjacent vertical supports. For each adjacent pair of vertical supports, a pair of horizontal supports may be coupled thereto and extend therebetween at opposite ends of each vertical support of the pair. In particular, for each adjacent pair of vertical supports, a horizontal support may be coupled to an end of each vertical support proximate the base 414 and a horizontal support may be coupled to an end of each vertical support opposite the base 414. The base 414 and the horizontal and vertical supports provide a structural frame of the housing 412 for joining the cover 416, the side panels 418, 420, and the rear panel 422 to the base 414. The cover 416 may be joined to the base 414 by coupling the cover 416 to the ends of the vertical supports opposite the base 414 and/or the horizontal supports located opposite the base 414. The side panels 418, 420 and the rear panel 422 may be joined to the base 414 and the cover 416 by coupling the respective panel 418, 420, 422 to a pair of horizontal supports and/or a pair of vertical supports. The panels 418, 420, 422 may also be coupled directly to the base 414 and/or the cover 416 in addition or alternative to being coupled to structural supports. In the example stand 404, horizontal supports are not included between the pair vertical supports across which the front opening 426 extends to enable greater access to the interior cavity 424 when the access door 428 is opened and/or removed. More or fewer vertical and horizontal supports may be included in the housing 412. Moreover, in some examples, no structural supports may be included in the housing 412, and the panels 418, 420, 422 may be coupled directly to and join the base 414 and the cover 416. The base 414, the cover 416, and the panels 418, 420, 422 may be removably coupled to the structural supports and/or directly to one another using fasteners (e.g., screws and/or bolts) or another mechanical coupling means (e.g., a tab and corresponding slot connection). Additionally and/or alternatively, the base 414, the cover 416, and the panels 418, 420, 422 may be permanently coupled to the structural supports and/or directly to one another using a suitable means, such as welding.

The stand 404 also includes feet 434 extending outward from the base 414. The feet 434 may be coupled to the base 414 (e.g., using fasteners and/or a tab and corresponding slot connection) or the feet 434 may be formed integrally with the base 414. In the example embodiment, the feet 434 include a pair of feet 434 (i.e., two feet 434) extending outward from the base 414 proximate opposing ends thereof. The feet 434 are thereby spaced apart and define a seat gap 436 therebetween. The seat gap 436 is suitably sized (i.e., has a suitable width extending between the feet 434) to receive at least a portion of a base of a player chair (not shown) therein. A foot cover 438 is coupled to and extends across the feet 434, above the seat gap 436. In the example stand 404, the foot cover 438 is removably coupled to the feet 434 using fasteners or another suitable means (e.g., a tab and corresponding slot connection). When a player is seated in a chair at the electronic gaming system 400 (shown in FIG. 4), a portion of the base of the chair may be tucked into the seat gap 436 and below the foot cover 438, allowing the player to be positioned closely to the electronic gaming system 400 with their feet rested on the foot cover 438. The foot cover 438 may include a middle recess (not shown) formed therein to facilitate closer positioning of the chair and player to the electronic gaming system 400. In the example stand 404, a footrest 440 is coupled to the foot cover 438 to enable greater user comfort when using the electronic gaming system 400. The footrest 440 includes a pair of mounts 442 coupled to and extending vertically above the foot cover 438 and a footrest beam 444 coupled to and extending across the mounts 442. A player seated at the electronic gaming system 400 may selectively rest their feet on the foot cover 438 and/or the footrest 440, depending on the comfort provided to the player.

The feet 434 extend substantially parallel with one another in a direction that the access door 428 faces (i.e., the feet 434 extend perpendicular to the access door 428). In some examples, one or both of the feet 434 may extend at an oblique angle relative to one another and/or the access door 428, and/or one or both of the feet 434 may extend outward from the base 414 in a direction other than the direction that the access door 428 faces (e.g., in a direction that the rear panel 422 faces). However, the feet 434 suitably extend substantially parallel to one another to maximize the length that the feet extend 434 outward from the base 414, which in turn increases the stability of the electronic gaming system 400 as described further below. Moreover, the feet 434 suitably extend outward from the base 414 in the direction that the access door 428 faces as this may be the direction in which the electronic gaming system 400 is most susceptible to tip when assembled and installed on a casino floor. More specifically, when assembled and installed for use, the electronic gaming system 400 may typically be positioned such that the rear panel 422 is adjacent a wall of a casino floor and/or the electronic gaming system 400 may be aligned in a row or bank of multiple electronic gaming systems 400 (e.g., bank 600 shown in FIG. 18), such that the gaming system 400 is supported and restrained from tipping in directions that the panels 418, 420, 422 face. As shown in FIG. 4, the access door 428 and the display 405 face the same direction (i.e., both are player-facing when the electronic gaming system is assembled and installed for use), and the electronic gaming system 400 may not be otherwise restrained from tipping by an external support in this direction.

The stand 404 is suitably dimensioned (e.g., sized and shaped) in correspondence with the EGM 402 and provides a smooth transition between the stand 404 and the cabinet 408 of the EGM 402. For example, the stand 404 may have approximately the same width on a floor of a casino as the EGM 402. Specifically, referring to FIGS. 4 and 11, the housing 412 extends a width $W_1$ that is approximately the same as a width of EGM 402 (i.e., extending into the page on FIG. 4). Suitable widths $W_1$ vary and may be dictated by a width of the EGM 402 used with the stand 404 in the electronic gaming system 400. The width $W_1$ may be substantially constant between the cover 416 and the base 414 such that the side panels 418, 420 are each substantially planar and flush with a corresponding side of the EGM 402 (e.g., a corresponding side 409 of the cabinet 408 shown in FIG. 4). The rear panel 422 may additionally and/or alternatively be substantially planar and flush with a rear end of the EGM 402 (e.g., a rear end 411 of the cabinet 408 shown in FIG. 4).

Additionally, as shown in FIG. 11, a first length $L_1$ of the housing 412, which is defined by the cover 416, is also substantially the same as a length of cabinet base 410 (shown in FIG. 4) of the EGM 402. The first length $L_1$ may alternatively be slightly larger than the EGM 402 such that multiple stands 404 may be coupled together and arranged in a row or bank (e.g., bank 600 shown in FIG. 18) to maximize a number of gaming machines that may be positioned on a casino floor while providing sufficient clearance between adjacent EGMs 402. Moreover, the feet 434 extend outward a suitable length from the base 414 such that the stand 404 defines an increased second length $L_2$ at the base 414 and the feet 434 that is greater than the length $L_1$ of the cover 416 and the EGM 402. The increased second length $L_2$ at the base 414 and the feet 434 improves structural stability of electronic gaming system 400 (shown in FIG. 4) to prevent tipping and comply with regulatory requirements. Suitably, the second length $L_2$ is at least 1.5 times greater than the first length $L_1$, such as at least 1.75 times greater than the first length $L_1$, or at least two times greater than the first length $L_1$. It will be appreciated that the length $L_2$ may be limited by the amount of floorspace available for the electronic gaming system 400. The second length $L_2$ may thereby be between 1.5 times and five times greater than the first length $L_1$, such as between 1.75 times and four times greater than the first length $L_1$, between two times and three times greater than the first length $L_1$, between 1.5 times and 2.5 times greater than the first length $L_1$, between 1.75 times and 2.5 times greater than the first length $L_1$, or between two and 2.5 times greater than the first length $L_1$.

Referring to FIG. 4, the stand 404 extends a second height $H_2$ between the base 414 and the cover 416. As described above, when the electronic gaming system 400 is assembled, the EGM 402 is positioned on the stand 404, and the EGM 402 extends a first height $H_1$ above the stand 404. The first height $H_1$ of the EGM 402 and the second height $H_2$ of the stand 404 collectively define a total height of electronic gaming system 400. Suitably, the second height $H_2$ elevates the EGM 402 such that the display 405 of the EGM 402 is at an ergonomically suitable height for a player when using the electronic gaming system 400.

Referring to FIGS. 5-11, the cover 416 includes a top, or first, surface 446 on which the EGM 402 is seated when coupled to the stand 404. The cover 416 includes through-holes 448 that extend from the first surface 446 to the interior cavity 424. The through-holes 448 align with corresponding holes (not shown) in the cabinet base 410 and receive fasteners (e.g., screws and/or bolts) to removably couple the EGM 402 to the stand 404. The cover 416 also defines windows 450 in the first surface 446. The windows 450 extend through the cover 416 and provide access to the interior cavity 424 of the housing 412. In the example embodiment, the windows 450 include a pair of windows 450 each formed in proximity to a pair of through-holes 448. In particular, a pair of through-holes 448 are formed on opposing sides of each window 450. The windows 450 are positioned on the cover 416 to align with corresponding openings (not shown) in the cabinet base 410 (shown in FIG. 4). When the cabinet 408 is positioned on and coupled to the stand 404, as shown in FIG. 4, electrical and/or communication wiring may be run between the interior cavity 424 of the stand 404 to an interior of the cabinet 408 of the EGM 402, via the windows 450 and the corresponding openings in the cabinet base 410, for communicatively coupling electronic gaming components (e.g., components 470 shown in FIG. 13) in the stand 404 to electronic gaming components positioned within cabinet 408 (e.g., the game controller 202). Additionally and/or alternatively, power wires may be run between the stand 404 and the EGM 402 through the windows 450 and the corresponding openings in the cabinet base 410.

The stand 404 also includes a keeper bracket 452 coupled to the housing 412. In the example stand 404, the keeper bracket 452 is coupled to the top surface 446 of the cover 416. In other examples, the keeper bracket 452 may be coupled to the housing 412 at another suitable location (e.g., to a side surface of the cover 416 or to the rear panel 422). The keeper bracket 452 extends above the top surface 446 and is received within a corresponding interlocking feature defined in the cabinet base 410 of the EGM 402 to stabilize the EGM 402 when positioned on the stand 404 (as shown in FIG. 4) before and/or in the alternative to coupling the EGM 402 to the stand 404 using additional mechanical elements or tooling. For example, the keeper bracket 452 may stabilize the EGM 402 before the EGM 402 is coupled to the stand 404 using fasteners that extend through the through-holes 448 and the corresponding holes in the cabinet base 410. The keeper bracket 452 facilitates restraining against tipping of the EGM 402 when the EGM 402 is positioned on the stand 404. Suitably, in some examples, the keeper bracket 452 facilitates restraining tipping of the EGM 402 when the EGM 402 is positioned on the cover 416 and before the EGM 402 is coupled to the stand 404 using fasteners that extend through the through-holes 448 and corresponding holes in the cabinet base 410.

Figure 12:
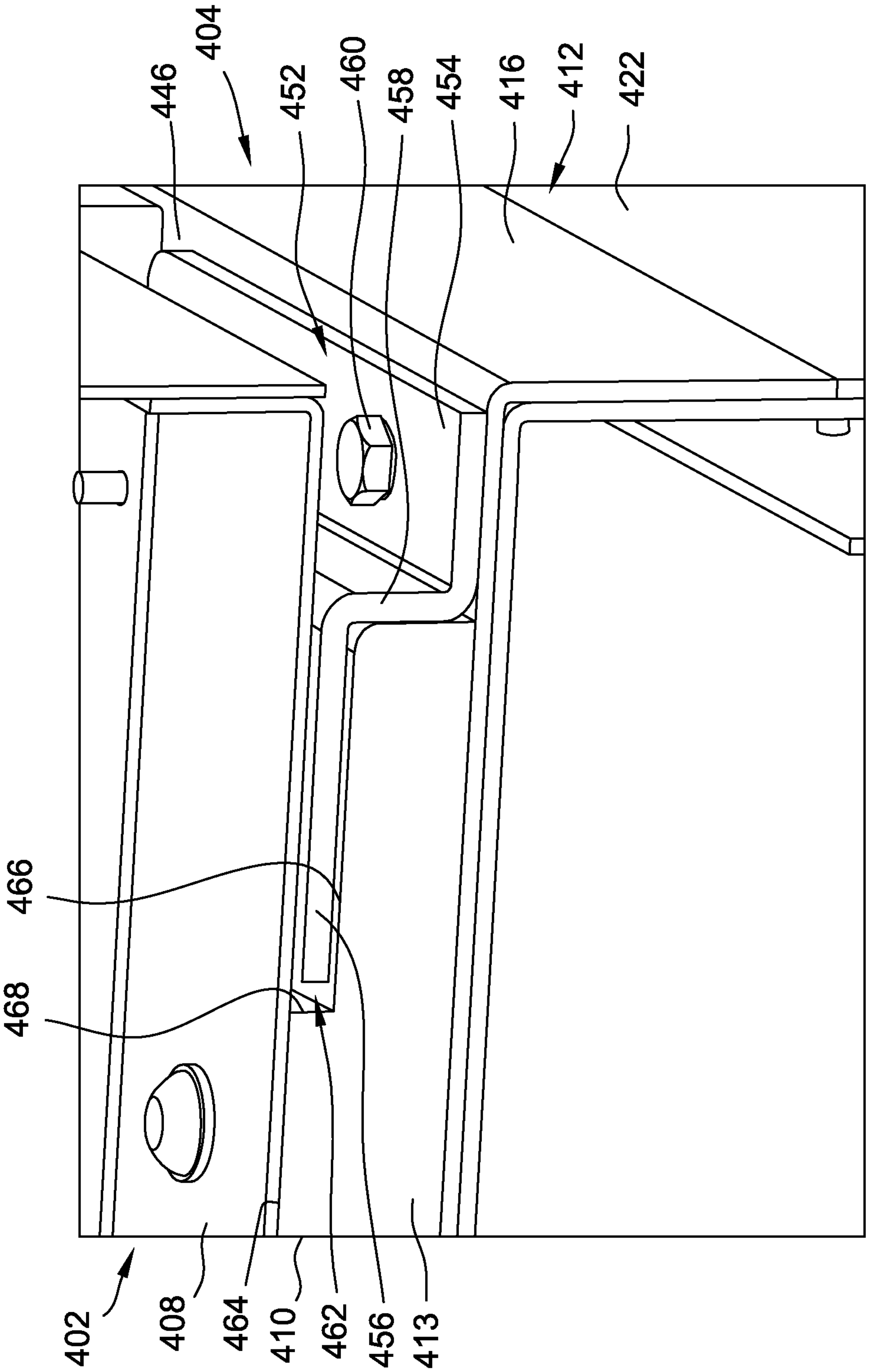
FIG. 12 is a cross section view showing engagement between a keeper bracket of the stand and a cabinet base of the electronic gaming machine of the electronic gaming system shown in FIG. 4.

FIG. 12 is a cross section view showing engagement between the keeper bracket 452 of the stand 404 and the cabinet base 410 of the EGM 402. The keeper bracket 452 includes a first portion 454 coupled to the top surface 446 of the cover 416 and a distal free second portion 456 raised relative to the first portion 454. A third portion 458 joins the first portion 454 and the second portion 456. The first portion 454, the second portion 456, and the third portion 458 define a "Z-profile" of the keeper bracket 452. The first portion 454 is coupled to the top surface 446 of the cover 416 using suitable fasteners 460 (e.g., set bolts, set screws, wood screws, and/or high-retention rivets). In the illustrated example, the fasteners 460 are hex bolts. In the example stand 404, corresponding holes (not shown) may be defined in the top surface 446 of the cover 416 for receiving the fasteners 460 to couple the first portion 454 to the top surface 446. In other examples, the stand 404 may be retrofitted with the keeper bracket 452 by forming (e.g., via drilling) holes into the top surface 446 before and/or during coupling the first portion 454 to the top surface 446. The first portion 454 is coupled to the top surface 446 proximate to a rear edge of the cover 416, which is adjacent to the rear panel 422, and extends inward (e.g., horizontally) across the top surface 446, opposite the rear edge, to the third portion 458. The third portion 458 extends transversely (e.g., vertically) between and joins the first portion 454 and the second portion 456. The distal free second portion 456 is raised relative to the first portion 454 by the transverse extent of the third portion 458. The second portion 456 extends inward (e.g., horizontally) from the third portion 458, opposite the first portion 454, to complete the Z-profile of the keeper bracket 452, such that the second portion 456 is cantilevered by the first portion 454 coupled to the top surface 446. The Z-profile of the keeper bracket 452 and the cantilevered second portion 456 enable the keeper bracket 452 (i.e., the second portion 456) to be received within a corresponding interlocking feature defined in the cabinet base 410 to facilitate restraining against tipping of the EGM 402 on the stand 404. Moreover, the keeper bracket 452 is positioned at a suitable location on the top surface 446 to facilitate aligning the EGM 402 when the EGM 402 is positioned on the top surface 446 and the second portion 456 is received within the corresponding interlocking feature defined in the cabinet base 410.

As shown in FIG. 12, the cabinet base 410 includes a plinth 413. The plinth 413 may have a suitable weight to provide structural stability (e.g., by lowering a center of mass) to the EGM 402 and facilitate supporting the EGM 402 on the stand 404. The plinth 413 is coupled to the cabinet 408 (e.g., using fasteners as shown in FIG. 12) and defines a notch 462 therebetween. The notch 462 forms the corresponding interlocking feature for the keeper bracket 452 and is sized and shaped to receive the second portion 456 therein, as shown in FIG. 12. In particular, the plinth 413 includes a top plinth surface 464 coupled to the cabinet 408 and a recessed plinth surface 466 that is lowered relative to the top plinth surface 464. The notch 462 is defined between the recessed plinth surface 466 and a bottom of the cabinet 408. The plinth 413 also includes a side plinth surface 468 that extends transversely (e.g., vertically) between and joins the top plinth surface 464 and the recessed plinth surface 466.

During assembly of the electronic gaming system 400, the EGM 402 is positioned on (e.g., slid onto) the top surface 446 of the cover 416 of stand 404 and urged back towards the rear edge of the cover 416. The second portion 456 of the keeper bracket 452 is received within the notch 462 defined in the plinth 413. The EGM 402 may be urged back until a distal end of the second portion 456 contacts the side plinth surface 468. When the keeper bracket 452 (i.e., the second portion 456) is received within the notch 462 and engaged with the plinth 413, the keeper bracket 452 provides torsional stability to the EGM 402 by restraining against tipping of the EGM 402 on the stand 404 (e.g., in the counter-clockwise direction as shown in FIGS. 4 and 12) while an operator is installing the EGM 402 on the stand 404. Thereafter, the cabinet 408 may be further secured to the stand 404 using fasteners (e.g., screws and/or bolts) that extend through the through-holes 448 (shown in FIGS. 5 and 10) defined in the cover 416 and corresponding holes (not shown) that extend through the bottom of the cabinet 408, the cabinet base 410, and the plinth 413. Additionally, in some examples, the notch 462 may extend along only a portion of the plinth 413 and has a width that corresponds to a width $W_2$ of the second portion 456 keeper bracket 452 (shown in FIG. 10). Thus, in these examples, the notch 462 and the keeper bracket 452 must be aligned in order for the second portion 456 to be received within the notch 462 as the EGM 402 is urged towards the rear end of the cover 416. As a result, the keeper bracket 452 may also facilitate aligning (e.g., centering) the EGM 402 on the stand 404 by preventing rearward movement of the EGM 402 on the cover 416 if the notch 462 is not aligned with the keeper bracket 452. Moreover, when the EGM 402 is positioned on the stand 404 and the keeper bracket 452 is received within the notch 462, an operator may open the cabinet 408 of the EGM 402, run electrical and/or communication wiring between the cabinet 408 and the interior cavity 424 of the stand 404, through the windows 450 defined in the cover 416 and the corresponding openings in the cabinet base 410, to communicatively couple electronic gaming components in the cabinet (e.g., the game controller 202) and electronic gaming components housed within the interior cavity 424 (e.g., components 470 shown in FIG. 13). The torsional stability provided by keeper bracket 452 received within the notch 462 may enable the operator to run the electrical and/or communication wiring before and/or during coupling the EGM 402 to the stand 404 using fasteners as described above.

Figure 13:
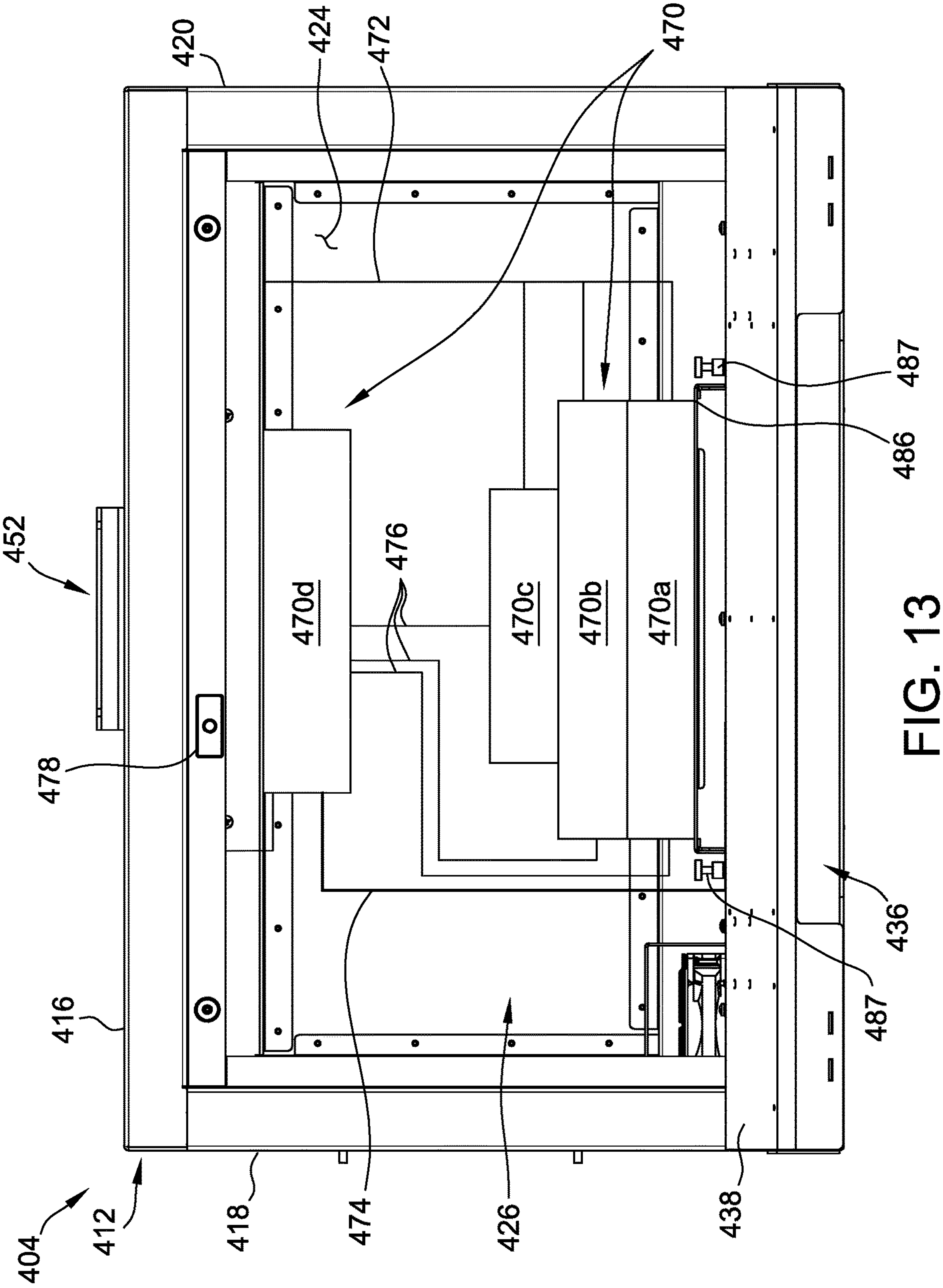
FIG. 13 is a front view of the stand with an access door removed and electronic gaming components shown housed within an interior cavity of the stand.
Figure 14:
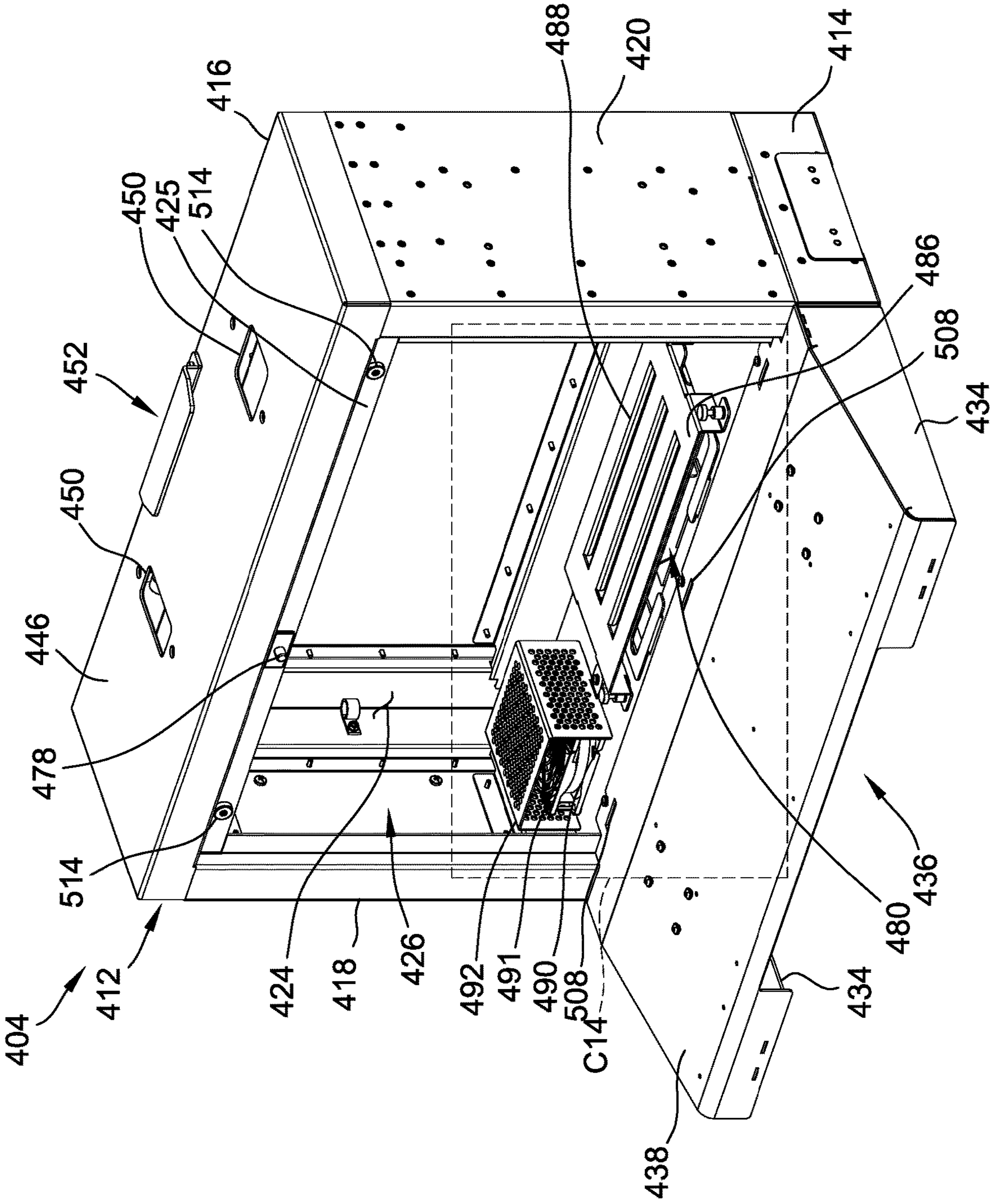
FIG. 14 is a front perspective view of the stand with the access door removed and the electronic gaming components omitted.
Figure 15:
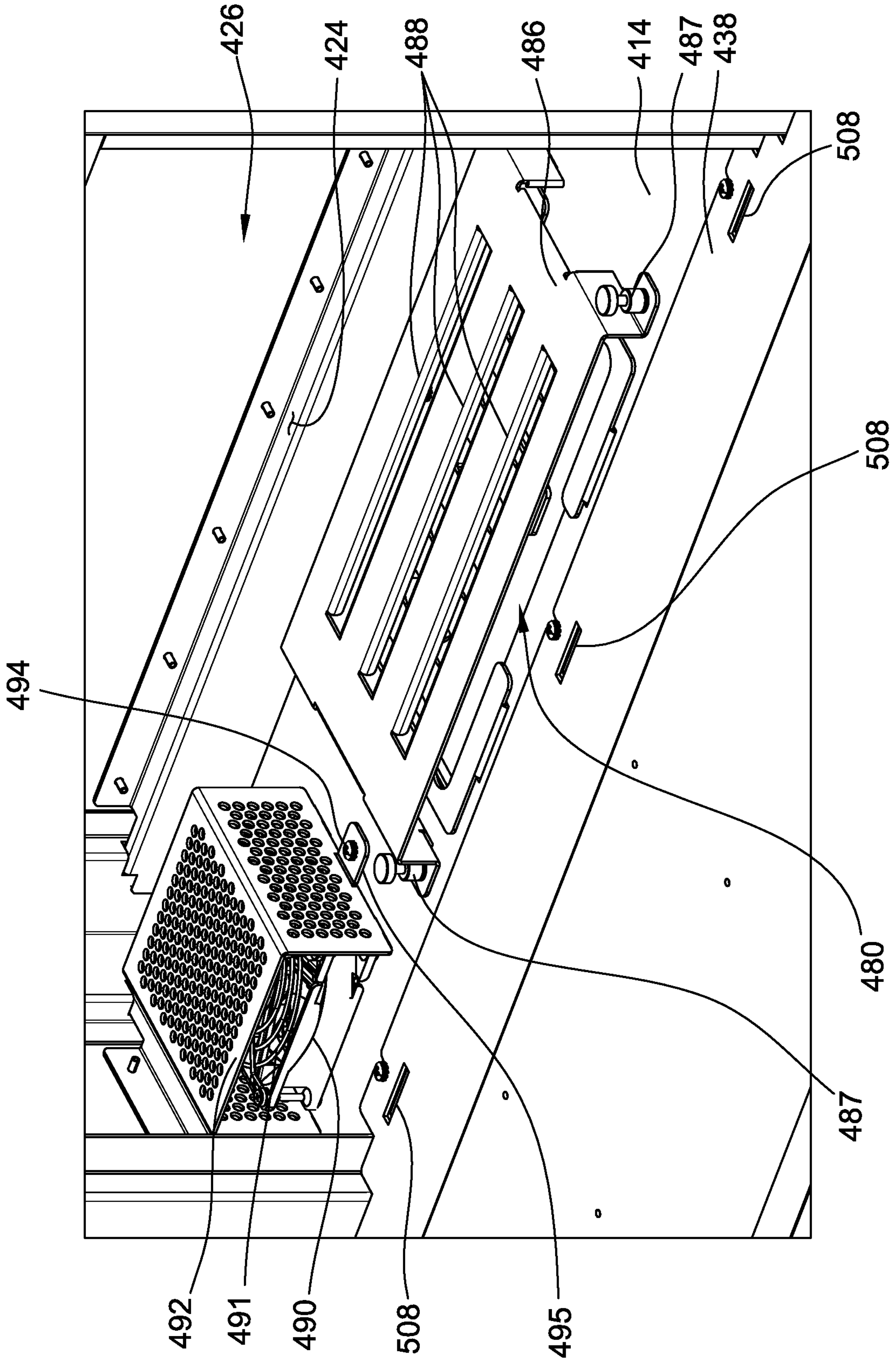
FIG. 15 is an enlarged view of the Section $C_{14}$ in FIG. 14 indicated by dotted lines.

Referring to FIG. 11 and with additional reference to FIGS. 13-15, the internal features and components within the interior cavity 424 of the stand 404 will now be described. FIG. 13 is a front view of the stand 404 with the access door 428 removed and electronic gaming components 470 housed within the interior cavity 424 of the stand 404. FIG. 14 is a front perspective view of the stand 404 with the access door 428 removed and the electronic gaming components 470 shown in FIG. 13 omitted for clearer depiction of certain features and internal components of the stand 404. FIG. 15 is an enlarged view of the Section $C_{14}$ in FIG. 14 indicated by dotted lines.

As shown in FIG. 13, in the example embodiment, the stand 404, and more specifically the housing 412, includes one or more electronic gaming components 470 contained within the interior cavity 424. The electronic gaming components 470 may include any suitable electronic components of the electronic gaming system 400 that are used for operating the EGM 402 (e.g., used to control gameplay on the display 405 of the EGM 402, shown in FIG. 4). For example, the electronic gaming components 470 may include primary and/or peripheral or auxiliary computer hardware devices that are communicatively coupled to the game controller 202 housed within the cabinet 408 of the EGM 402 for operating the EGM 402. In some examples, the electronic gaming components 470 may include the game controller 202, or one or more components of the game controller 202, such as the one or more processors 204, the memory 208 that may include one or more game programs 206, the RNG conversion engine 210, and/or the RNG 212, described above for the gaming device 200 with reference to FIG. 2A. The stand 404 may additionally and/or alternatively include and/or house within the interior cavity 424 one or more of the components 220-242, described above for the gaming device 200 with reference to FIG. 2A.

In the example stand 404, the electronic gaming components 470 include auxiliary or peripheral computer hardware devices such as, for example, one or more network devices (e.g., a network switch, a modem, a router, or any other suitable network device), one or more media players, a bank controller (e.g., for controlling a progressive jackpot), a player tracking device, and other suitable auxiliary or peripheral devices used to operate the EGM 402. In the illustrated example, the electronic gaming components 470 include one or more multiport network switches 470*a*, a modem 470*b*, and a media player 470*c*. Communication wiring 472 is coupled to the electronic gaming components 470 (e.g., the one or more multiport network switches 470*a*, the modem 470*b*, and/or the media player 470*c*) and may be run between the interior cavity 424 and the cabinet 408 of the EGM 402 (shown in FIG. 4), through the windows 450 and the corresponding openings in the cabinet base 410, to communicatively couple the electronic gaming components 470 with components housed within the cabinet 408 (e.g., the game controller 202).

The electronic gaming components 470 may also include power distribution components. For example, as shown in FIG. 13, the electronic gaming components 470 further include a power distribution component 470*d*, such as a power strip. The power distribution component 470*d* may be supported within the interior cavity 424, for example, by coupling the power distribution component 470*d* to an interior surface of the cover 416 (e.g., using mechanical fasteners such as screws, adhesive, adhesive strips, hook and look fastener strips, hangers, or any other suitable means). The power distribution component 470*d* may receive power from an external power source (e.g., directly through an external outlet, indirectly through cabinet 408, or another source, such as a battery). In the example embodiment, power input wiring 474 extends through an opening in the housing 412 (e.g., rear opening 423 defined in and extending through the rear panel 422 and the base 414, shown in FIG. 9, and/or one or both of the side openings 419, 421 respectively defined in sides of the base 414 that are adjacent the side panels 418, 420, shown in FIGS. 6 and 7), into the interior cavity 424, and to the power distribution component 470*d*. Power output wiring 476 is coupled to the power distribution component 470*d* and may provide power to the remainder of the electronic gaming components 470 (e.g., the electronic gaming components 470*a*-470*c*). The power output wiring 476 may additionally and/or alternatively be run between the interior cavity 424 and the cabinet 408 of the EGM 402 (shown in FIG. 4), through the windows 450 and the corresponding openings in the cabinet base 410, to provide power to one or more components housed within the cabinet 408 (e.g., the game controller 202).

Still referring to FIGS. 11 and 13-15, the base 414 includes a platform opening 480 that connects a cable gateway 482 defined in the base 414 to the interior cavity 424. The cable gateway 482 enables external communication and/or electrical wiring (e.g., power input wiring 474) to be run through the base 414 and the wiring may be run into the interior cavity 424 via the platform opening 480. The cable gateway 482 may be connected to an exterior of the base 414 by the rear opening 423 defined in and extending through the rear panel 422 and the base 414, shown in FIG. 9, and/or one or both of the side openings 419, 421 respectively defined in sides of the base 414 that are adjacent the side panels 418, 420, shown in FIGS. 6 and 7. Thus, external wiring (e.g., power input wiring 474) may be run into the base 414 via one or more of the openings 419, 421, 423, through the base 414 via the cable gateway 482, and into the interior cavity 424 via the platform opening 480. The external wiring may thereby be connected by an operator to one or more of the electronic gaming components 470 within the interior cavity 424. Additionally and/or alternatively, the external wiring may continue to be run through the interior cavity 424 and into the cabinet 408 of the EGM 402 through the windows 450 and the corresponding openings in the cabinet base 410, for connecting to one or more components housed within the cabinet 408 (e.g., the game controller 202). Access to the cable gateway 482 may be selectively limited or restricted by mouse hole covers 484. For example, in the example stand 404, mouse hole covers 484 are provided that removably couple to the base 414 at the side openings 419, 421 to selectively limit or restrict access to the cable gateway 482 via the openings 419, 421. Additionally and/or alternatively, a mouse hole cover 484 may be provide that removably couples to the rear panel 422 at the rear opening 423 (shown in FIG. 9) to selectively limit or restrict access to the cable gateway 482 via the rear opening 423.

As shown in FIG. 13, the electronic gaming components 470*a*-470*c* are supported above the platform opening 480 in the base 414 by a platform 486. The platform 486 may be removably coupled to the base 414 above the platform opening 480, for example, by tabs (not labeled) that fit into corresponding slots (not labeled) in the base 414 adjacent the platform opening 480 and secure the platform 486 thereto. The platform 486 may additionally and/or alternatively be equipped with quick-release pins 487 that snap-fit into corresponding holes (not labeled) in the base 414 adjacent the platform opening 480. To remove the platform 486 from the base 414, the pins 487 may be selectively released from the corresponding holes and the platform 486 may be pulled away from the base 414 to remove the tabs from the corresponding slots. The platform 486 also includes one or more wiring gaps 488 formed in a surface of the platform that supports the components 470*a*-470*c*. The wiring gap(s) 488 may be used to run external wiring (e.g., power input wiring 474 or other communication wiring) from the cable gateway 482 into the interior cavity 424. More specifically, external wiring may be run through the cable gateway 482, the platform opening 480, and the wiring gap(s) 488, and into the interior cavity 424, for connecting to one or more of the electronic gaming components 470 within the interior cavity 424 and/or for connecting to one or more components housed within the cabinet 408 (e.g., the game controller 202).

Accordingly, the electronic gaming components 470 housed within the stand 404 may cooperate and/or communicate with electronic components (e.g., the game controller 202) of the EGM 402 that are positioned within the cabinet 408. Thereby, the stand 404 and the EGM 402 may be electrically integrated with one another. Suitably, the stand 404 contains the electronic gaming components 470 to alleviate the footprint of the EGM 402, by facilitating reducing the number of electronic gaming components stored within the limited space of the cabinet 408. In particular, in conventional electronic gaming machines, the electronic gaming components 470 described herein may be positioned within a cabinet of the EGM. To fit such components inside of the cabinet, the size of the cabinet must be increased, resulting in an increased floor footprint of the electronic gaming machine (e.g., by making it wider), and/or resulting in an increased a height of the electronic gaming machine 402, reducing stability of the gaming machine and/or sacrificing the ergonomic size and shape of the electronic gaming machine. The gaming system 400 of the present disclosure provides an advantage over known electronic gaming machines in that it includes the electrically integrated EGM 402 and stand 404. More specifically, the stand 404 accommodates certain electronic gaming components 470 and provides communication between them and other gaming components (e.g., the game controller 202) housed within the cabinet 408 of the EGM 402, allowing for a more compact gaming system 400. Offloading electronic gaming components 470 into the stand 404 also facilitates lowering a center of mass of the electronic gaming system 400 and improving the stability thereof. Further, the mechanical coupling between the stand 404 and the EGM 402 enables the EGM 402 and the stand 404 to be electrically integrated while complying with certain gaming regulatory requirements. For example, at least some gaming regulatory requirements require that certain electronic components used for operating the EGM 402 be physically attached to the cabinet 408. The stand 404 forms an extension of the cabinet 408 through the physical coupling means described above, and therefore the electronic gaming components 470 housed within the interior cavity 424 may be considered to be physically attached to the cabinet. Thereby, the electronic gaming system 400 facilitates compliance with the above-described gaming regulatory requirements while minimizing the overall size (e.g., footprint and/or height) of the EGM 402 and providing an improved aesthetic and/or ergonomic design of the EGM 402.

The example electronic gaming system 400 also includes security features that facilitate electrical integration between the stand 404 and the EGM 402. For example, as shown in FIG. 13, the stand 404 includes a security switch 478 or "sensor" that is operable to detect whether the access door 428 is in a closed position, described in further detail below. The switch 478 is suitably communicatively coupled to one or more components (e.g., the game controller 202) housed within the cabinet 408 of the EGM 402 (shown in FIG. 4) by communication wiring (e.g., the communication wiring 472) that may be run between the interior cavity 424 and the cabinet 408 of the EGM 402, through the windows 450 in the cover 416 and the corresponding openings in the cabinet 408. In the example embodiment, the switch 478 is a pushbutton switch, though any other suitable sensors may be used. When the access door 428 is opened, the switch 478 is released and provides a signal to the EGM 402 (e.g., to the game controller 202), which may cause the game controller 202 to generate an alert, interrupt game play, and/or take other suitable actions. Moreover, as described above and in further detail below, the access door 428 includes a lock 430 (e.g., a keyed cam lock) that secures the access door 428 in the closed position to limit or prevent tampering with electronic gaming components 470 housed within the interior cavity 424.

Referring to FIGS. 11, 14, and 15, the stand 404 also includes ventilation and cooling features for the electronic gaming components 470 housed within the interior cavity 424 to facilitate electrical integration between the stand 404 and the EGM 402. As described above, the housing 412 includes a plurality of vent outlets 432 (e.g., a plurality of through-holes) defined therein and extending therethrough which promote air circulation within the interior cavity 424 for cooling electronic gaming components housed within the interior cavity. The vent outlets 432 are defined in the access door 428 in the example stand 404. In other examples, the vent outlets 432 may additionally and/or alternatively extend through the housing 412 at any suitable location (e.g., on one or more of the panels 418, 420, 422) to promote air circulation within the interior cavity 424. The housing 412 also includes an inlet vent opening 433 extending therethrough that allows ambient air to be drawn into the interior cavity 424. The vent opening 433 may be a single opening defined in the housing 412 or may be a plurality of through-holes defined in the housing 412. In the example stand 404, as shown in FIG. 11, the vent opening 433 is defined in the base 414. In other examples, the vent opening 433 may extend through the housing 412 at any suitable location (e.g., on one or more of the panels 418, 420, 422). Suitably, the vent opening 433 and the vent outlets 432 are defined in the housing at different locations to promote air circulation within the interior cavity 424. Thus, while the vent opening 433 is defined in the base 414 and the vent outlets 432 are defined in the access door 428 in the example stand 404, the vent opening 433 may extend through the housing 412 at any suitable location and the vent outlets 432 may extend through the housing 412 at any suitable location that is different from the location of the vent opening 433.

The stand 404 also includes a cooling fan 490 disposed within the interior cavity 424. The cooling fan 490 is operable to direct or draw ambient air through the vent opening 433 and into the interior cavity 424 for cooling the electronic gaming components 470. Suitably, the cooling fan 490 is disposed adjacent the vent opening 433 to enable the cooling fan 490 to draw ambient air through the vent opening 433 and into the interior cavity 424. For example, in the example stand 404, the cooling fan 490 is coupled to the base 414 above the vent opening 433 defined in the base 414. It will be appreciated that the cooling fan 490 may be coupled to any suitable internal component of the housing 412 to dispose the cooling fan 490 adjacent the vent opening 433. For example, the vent opening 433 may extend through one of the panels 418, 420, 422, and the cooling fan 490 may be disposed adjacent the vent opening 433 by coupling the cooling fan 490 to an interior surface of the respective panel 418, 420, 422. In some examples, more than one cooling fan 490 and corresponding vent opening 433 may be included in the stand 404 at the same or different locations within the interior cavity 424.

The cooling fan 490 is provided with first and second fan guards 491, 492. The cooling fan 490 and first fan guard 491 may be mounted in the interior cavity 424 adjacent (e.g., above) the vent opening 433 via fasteners 493 (e.g., screws, shown in FIG. 11). The first fan guard 491 is a grille or grate disposed over (e.g., above) the cooling fan 490 that limits or restricts access to fan blades (not shown) of the cooling fan 490 during operation while enabling air to flow therethrough. In the example stand 404, the fasteners 493 engage a flange (not labeled) of each of the cooling fan 490 and the first fan guard 491 and are received within corresponding holes (not labeled) in the base 414 adjacent the vent opening 433. The second fan guard 492 is a perforated cover disposed over (e.g., above) the cooling fan 490 and the first fan guard 491 that further limits or restricts access to the fan blades during operation of the cooling fan 490 while enabling air to flow therethrough. The second fan guard 492 may also be used as a platform on which interior components (e.g., one or more of the electronic gaming components 470) housed within the stand may be seated without choking airflow from the cooling fan 490. The second fan guard 492 is mounted over (e.g., above) the cooling fan 490 and the first fan guard 491 via fasteners 494 (e.g., screws, shown in FIG. 15) that respectively engage flanges 495 of the second fan guard 492 and are received within corresponding holes (now shown) in the base 414.

In operation, the cooling fan 490 draws or directs ambient air through the adjacent vent opening 433 and into the interior cavity 424. The air circulates within the interior cavity and exits through the vent outlets 432 and/or any other suitable openings in the housing 412. For example, the platform opening 480 may provide any additional and/or alternative egress location for air flowing within the interior cavity 424. Circulation of airflow into and out of the stand 404 provides convective cooling of electronic gaming components 470 housed within the stand 404 to facilitate reducing overheating or other damage (e.g., thermally induced damage) to the gaming components 470.

Figure 16:
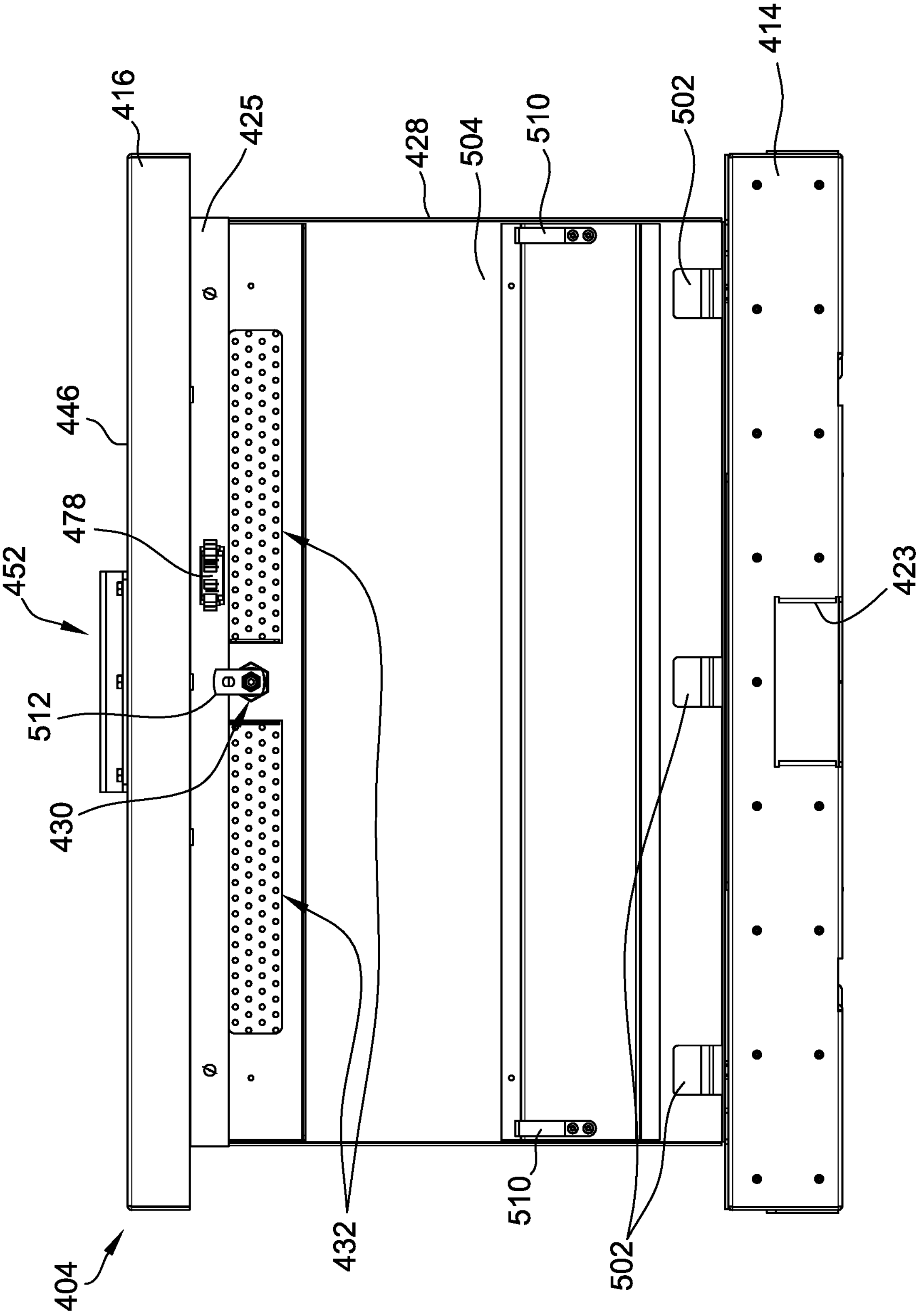
FIG. 16 is a rear view of a partially assembled stand with various components omitted to depict features of the access door in greater detail.

Referring now to FIGS. 11 and 14-16, coupling of the access door 428 to the housing 412 and operation of the access door 428 will now be described. FIG. 16 depicts a rear view of a partially assembled housing 412 with various components omitted to depict the access door 428 coupled to the housing 412 and secured in a closed position. The access door 428 is movably coupled to the housing 412 such that the access door 428 is movable between the closed position (shown in FIGS. 5-8 and 16) and an open position (not shown) to selectively provide access to the interior cavity 424. In the example stand 404, the access door 428 is also removably coupled to the housing 412 such that access door 428 may be entirely separated from housing 412 when it is in the open position. For example, FIGS. 13-15 depict the housing 412 with the access door 428 removed. Thus, the access door 428 may be selectively moved between the closed position, the open position, and the removed position.

To enable movement and removal of the access door 428, the access door 428 is coupled to the housing 412 via a plurality of door flaps 502. The door flaps 502 may be made of any suitable material, such as a metal material for example. In one example, the door flaps 502 are made of galvanized steel. The door flaps 502 are attached (e.g., by welding, an adhesive, or other suitable means) to an interior surface 504 of the access door 428. Each door flap 502 includes a tongue 506 (shown in FIG. 11) that extends outward from a bottom edge of the access door 428. Each tongue 506 is received (e.g., inserted into) a corresponding flap slot 508 (shown in FIGS. 14 and 15) defined in the housing 412. As shown in FIGS. 14 and 15, the flap slots 508 are defined in the base 414 and in a portion of the foot cover 438 that overlaps the base 414 when the foot cover 438 is coupled to the feet 434. The tongues 506 thereby extend through the foot cover 438 and into the base 414 when inserted into the flap slots 508.

Figure 19:
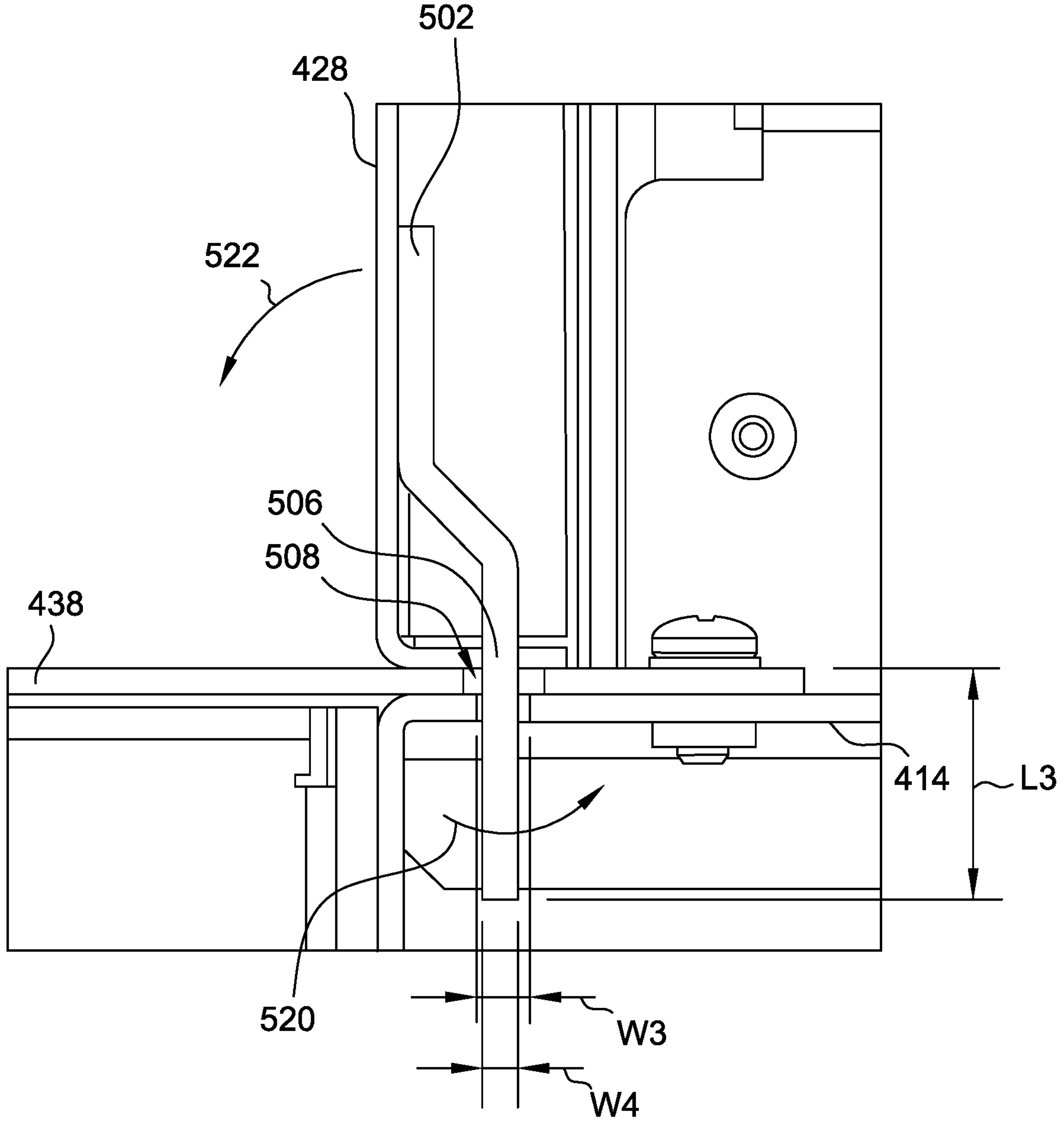
FIG. 19 is a cross section view showing connection between the access door and a housing of the stand in greater detail.

FIG. 19 is a cross section view showing a tongue 506 of one of the door flaps 502 received by a corresponding flap slot 508 in greater detail. The flap slots 508 are defined by corresponding slots formed in each of the foot cover 438 and the base 414 that align when the foot cover overlaps the base. The flap slots 508 each define a suitable clearance width $W_3$ that is greater than a thickness width $W_4$ of the corresponding tongue 506 inserted therein. The thickness width $W_4$ of the tongues 506 may be defined by the material used to form the door flaps 502. For example, the door flaps 502 may be made of 12 gauge galvanized steel, and the thickness width $W_4$ of the tongues 506 may be between about 2 mm to about 3 mm. The clearance width $W_3$ is greater than the thickness width $W_4$ to enable the door flaps 502 to pivot in the flap slots 508 and thereby allow the access door 428 to be pulled outward and pivot relative to the base 414 in moving between the closed position to the open position. That is, when the tongues 506 are inserted into the flap slots 508 to couple the access door 428 to the housing 412, the tongues 506 are able to pivot in a direction (indicated by the arrow 520 in FIG. 19) opposite a pulling direction for opening the access door 428 (indicated by the arrow 522 in FIG. 19) to enable the access door 428 to pivot to a suitable angle to clear the cover 416 and be subsequently removed from the housing 412. The clearance width $W_3$ may be selected to limit the degree to which the door flaps 502 can pivot in the flap slots 506 before engaging the foot cover 438 and/or the base 414 and thereby limit the angle to which the access door 428 can pivot. For example, the clearance width $W_3$ may limit the angle to which the access door 428 can pivot to about 10°, to about 20°, to about 30°, or to about 45°, relative to the plane defined by the front opening 426. In some examples, the clearance width $W_3$ may enable the access door 428 to pivot to an angle greater than about 45° up to about 90°, such as up to about 60°, up to about 75°, or up to about 80°, relative to the plane defined by the front opening. The tongues 506 also extend a tongue length $L_3$ outward from the bottom edge of the access door 428 and into the corresponding flap slots 508. The tongue length $L_3$ is a suitable length to enable the access door 428 to pivot to a suitable angle without prematurely liberating the tongues 506 from the flap slots 508.

To remove the access door 428 from the housing, an outward pulling force is applied to the access door 428 (e.g., at a top of the access door 428) to cause the access door 428 to pivot to a suitable position and allow the top of access door 428 to clear the cover 416. Once clear of the cover 416, the access door 428 may be pulled at a suitable angle (e.g., both upward and outward) to liberate the tongues 506 from the corresponding flap slots 508 and separate the access door 428 from the housing 412. Suitably, the provision of the door flaps 502 and corresponding flap slots 508 enables movably coupling the access door 428 to the housing 412 without a mechanical hinged connection and removing the access door 428 from the housing 412 with the use of tooling. However, in some embodiments, the access door 428 may be coupled to the housing 412 using a mechanical hinged connection.

Referring to FIG. 16, the access door 428 includes the lock 430 and spring clips 510 coupled on opposing sides of the interior surface 504 of the access door 428. The lock 430 is a keyed cam lock that includes a cam 512 that selectively engages an overhanging panel 425 of the cover 416. More specifically, the lock 430 is key-operated to move the cam 512 between an engaged position with the overhanging panel 425 (as depicted in FIG. 16) and a cleared position in which the cam 512 does not engage the overhanging panel (not shown). Moving the cam 512 to the engaged position secures the access door 428 in the closed position to limit or prevent tampering with electronic gaming components (e.g., components 470 shown in FIG. 13) housed within the interior cavity 424.

The spring clips 510 are made of a metal material (e.g., steel) to provide an earthing or grounding continuity between the access door 428 and internal structural supports of the housing 412 (e.g., vertical supports on opposite sides of the front opening 426). The access door 428 and structural components of the housing 412 (e.g., the internal structural supports and/or one or more of the panels 418, 420, 422) may be formed of a metal material (e.g., steel or aluminum) that has the ability to conduct electricity. The structural components of the stand 404 that have the ability to conduct electricity are suitably connected to an earthing or grounding system (e.g., an earthing strip) to reduce or eliminate the opportunity for the components to become electrically charged during operation. The spring clips 510 facilitate maintaining the electrical connection between the access door 428 and the earthing system when the access door 428 is closed. Thereby, the spring clips 510 facilitate increasing electrical safety of the stand 404 and, in particular, the access door 428.

The spring clips 510 may also provide a buffer between the access door 428 and the internal structural supports of the housing 412 when the access door 428 is closed and/or may provide an additional security feature by requiring that the cam 512 engage the overhanging panel 425 to maintain the access door 428 in the closed position. More specifically, when the access door 428 is moved to the closed position, the spring clips 510 may compress and, once a force is released from the access door 428, the spring clips 510 may deflect against the vertical supports of the housing 412 to urge the access door 428 to open. When the cam 512 engages the overhanging panel 425, the spring clips 510 remain compressed and are restricted from urging the access door 428 to open. This may ensure that an operator secures the access door 428 in the closed position using the lock 430. The spring clips 510 may also facilitate preventing operation of the EGM 402 when the cam 512 does not engage the overhanging panel 425. As described above, the security switch 478 is operable to detect whether the access door 428 is in a closed position. The security switch 478 is coupled to the overhanging panel 425 and engages the interior surface 504 of the access door 428 when closed. When the cam 512 does not engage the overhanging panel 425 and the access door 428 is urged to open by the spring clips 510, the security switch 478 provides a signal to the EGM 402 (e.g., to the game controller 202), which may cause the game controller 202 to generate an alert, interrupt game play, and/or take other suitable actions. Door buffers 514 (e.g., rubber stoppers, shown in FIG. 14) may be provided on the overhanging panel 425 to cushion engagement between the access door 428 and the overhanging panel 425 and facilitate preventing damage to the security switch 478.

Figure 17:
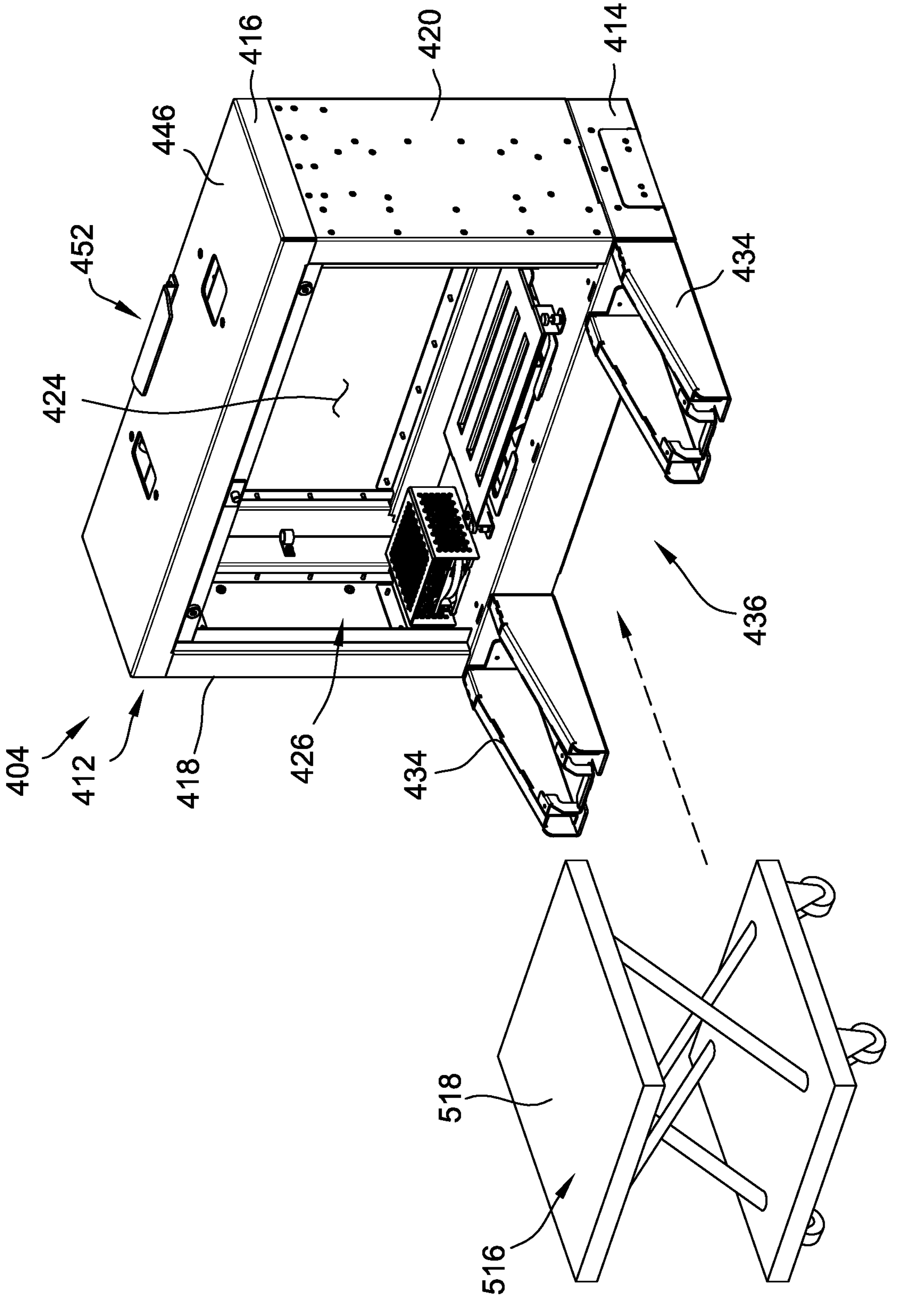
FIG. 17 is a perspective view of a partially assembled stand and a service lift.

Referring to FIGS. 14 and 17, when the access door 428 is removed from the housing 412 as described above, the interior cavity 424 is accessible to an operator for servicing, installation, and/or removal of internal components of the housing (e.g., the electronic gaming components 470). As described above, the foot cover 438 is removably coupled to the feet 434. As shown in FIG. 17, with the access door 428 removed and the tongues 506 liberated from the flap slots 508, the foot cover 438 may be removed from the feet 434 by releasing fasteners (not shown) connecting the foot cover 438 to the feet 434 and lifting and/or pulling the foot cover 438 from the base 414 and the feet 434. As shown in FIG. 11, the feet 434 each also include brackets 427 which engage corresponding slots 429 of the foot cover 438, and which may be released by pulling the foot cover 438 outward from the housing 412, after it has been unfastened from the feet 434 and with the access door 428 removed. Removing the foot cover 438 from the feet 434 provided easier access to the interior cavity for an operator. Moreover, referring to FIG. 17, removing the foot cover 438 provides clearance for a service lift 516 (e.g., a scissor lift) to be closely positioned to the housing 412 and, more specifically, the cover 416. In particular, with the foot cover 438 removed, the service lift 516 may be moved into the seat gap 436 between the feet 434 to position a lift table 518 of the service lift 516 into contact with the cover 416. The service lift 516 may be used for providing an EGM 402 to be positioned on the cover 416 and/or for removing an EGM 402 from the cover 416.

Figure 18:
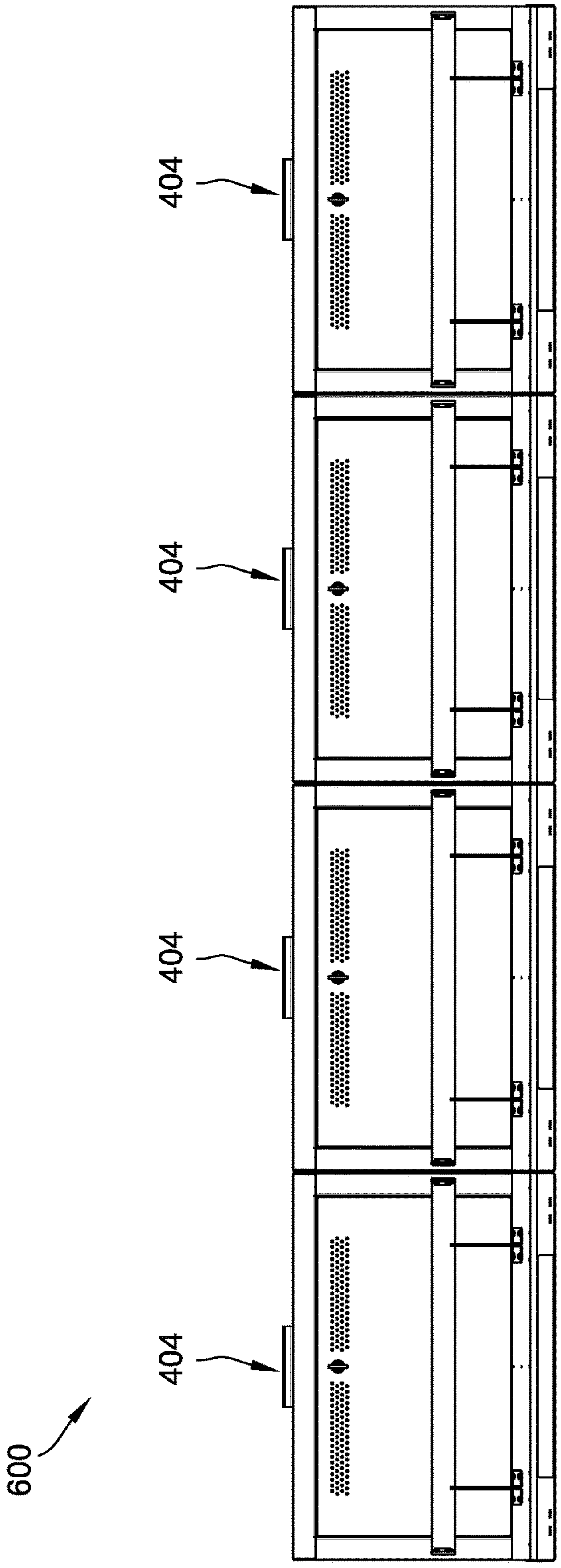
FIG. 18 is a perspective view showing a plurality of stands for use with the gaming system of FIG. 4, coupled in a bank configuration.

As shown in FIG. 18, multiple stands 404 may be coupled together in a row or bank 600. Each stand 404 in the bank 600 may support a separate EGM 402. For example, multiple stands 404 may be coupled together and arranged in the bank 600, and separately support an EGM 402, to maximize a number of electronic gaming systems 400 that may be positioned on a casino floor. As described above with reference to FIG. 10, each stand 404 is suitably sized (e.g., has a suitable first length $L_1$) such that multiple stands 404 may be coupled together and arranging in the bank 600 to maximize the number of electronic gaming systems 400 on the casino floor while providing sufficient clearance between adjacent EGMs 402.

Each stand 404 includes suitable fastening or coupling means to couple adjacent stands 404 in the bank 600. Referring to FIGS. 5-11, each stand 404 includes a plurality of bank fasteners 431 (e.g., screws, bolts, or pins) extending from the left side panel 418 which are received by corresponding bank fastening apertures 435 formed in the right side panel 420 of each stand 404. In the example stand 404, the left side panel 418 includes four bank fasteners 431 extending outward therefrom and the right side panel 420 includes four corresponding apertures 435. In other examples, the stand 404 may include more or fewer bank fasteners 431 and corresponding apertures 435. The bank fasteners 431 and the corresponding apertures 435 facilitate coupling adjacent stands 404 in horizontal alignment in the bank 600 with similar adjacent stands.

Exemplary technical effects of the methods, systems, and apparatus described herein include at least one of: (a) reduced sizing of an EGM cabinet by offloading certain electronic components in communication with the EGM into the stand of the gaming system; (b) improved stability of a gaming system provided by lowering a center of mass of the gaming system; (c) improved stability of the EGM during installation on a stand provided by engagement between the keeper bracket on the stand and the notch defined in the EGM; (d) compliance with certain known gaming regulatory requirements, which require that certain electronic components of a gaming system be attached to and/or provided within a cabinet of an EGM or a structure attached to a cabinet of an EGM; (e) reduced floor foot print of a gaming system; (f) improved security to a stand of an EGM by providing communication between a door switch on the stand and the game controller in a cabinet of the EGM; g) improved cooling to electronic gaming components housed within the stand to reduce overheating or other damage (e.g., thermally induced damage) to the gaming components; and/or h) enable quick, easy, and efficient assembly of the EGM on the stand and/or installation, servicing, and/or removal of the electronic gaming components housed within the stand.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

This written description uses examples to describe the disclosure, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electronic gaming system comprising:

an electronic gaming machine (EGM) comprising a cabinet, the cabinet comprising a cabinet base defining a notch therein;

a stand coupled to the EGM, the stand comprising:

a housing defining an interior cavity, the housing comprising a housing cover, a housing base, and feet coupled to the housing base, the cabinet being seated on the housing cover, the feet extending outward from the housing base such that the housing base and the feet together define a length that is greater than a length of the housing cover; and a keeper bracket coupled to the housing cover, wherein the keeper bracket is received within the notch to align the cabinet on the housing cover and restrain against tipping of the EGM relative to the stand.

2. The electronic gaming system of claim 1, wherein the keeper bracket includes a first portion coupled to the housing cover and a second portion that is received within the notch, the second portion being cantilevered and raised relative to the housing cover.

3. The electronic gaming system of claim 1, wherein one or more electronic gaming components are positioned in the interior cavity of the housing.

4. The electronic gaming system of claim 3, wherein the one or more electronic gaming components comprise at least one of a media player and a network device.

5. The electronic gaming system of claim 4, wherein a game controller is positioned within the cabinet, the one or more electronic gaming components being communicatively coupled to the game controller.

6. The electronic gaming system of claim 5, wherein the housing cover comprises at least one window extending therethrough to allow the one or more electronic gaming components to be communicatively coupled to the game controller via communication wiring.

7. The electronic gaming system of claim 3, wherein the housing comprises a vent opening extending therethrough, and a cooling fan disposed within the interior cavity adjacent the vent opening, the cooling fan being operable to direct ambient air through the vent opening and into the interior cavity for cooling the one or more electronic gaming components.

8. The electronic gaming system of claim 7, wherein the housing further comprises vent outlets extending through the housing at a location different than a location of the vent opening to promote air circulation through the interior cavity.

9. The electronic gaming system of claim 1, wherein the stand comprises a door coupled to the housing and movable between a closed position and an open position to selectively provide access to the interior cavity, the door comprising a lock to secure the door in the closed position, and a security switch configured to detect whether the door is in the closed position or the open position.

10. The electronic gaming system of claim 9, wherein the security switch is communicatively coupled to a game controller positioned within the cabinet, the security switch being configured to transmit a signal to the game controller when the door is in the open position.

11. The electronic gaming system of claim 1, wherein the housing base and the feet together define a length that is at least 1.5 times greater than a length of the housing cover.

12. A stand for supporting an electronic gaming machine (EGM) thereon, the stand comprising:

a housing defining an interior cavity for receiving one or more electronic gaming components therein, the housing comprising a cover for supporting the EGM, the cover defining at least one window extending therethrough to allow the one or more electronic gaming components to be communicatively coupled to one or more internal components provided within the EGM via communication wiring;

wherein the housing comprises a housing base and feet coupled to the housing base, the feet extending outward from the housing base such that the housing base and the feet together define a length that is greater than a length of the cover; and a keeper bracket comprising a first portion coupled to the cover and a cantilevered second portion that is raised relative to the first portion, the second portion being sized and shaped to be received within a corresponding notch of the EGM to align the EGM on the cover and restrain against tipping of the EGM relative to the stand.

13. The stand of claim 12, further comprising a door removably coupled to the housing and movable between a closed position and an open position to selectively provide access to the interior cavity, the door comprising a lock to secure the door in the closed position.

14. The stand of claim 13, wherein the door is removably coupled to the housing by door flaps that are inserted into corresponding flap slots formed in the housing to couple the door to the housing, the door flaps and corresponding flap slots being configured to enable the door to be moved between the closed position and the open position, the door flaps being removable from the flap slots to enable the door to be removed from the housing when the door is in the open position.

15. The stand of claim 13, further comprising a security switch configured to detect whether the door is in the closed position or the open position.

16. The stand of claim 12, wherein the housing comprises a vent opening extending therethrough, a cooling fan disposed within the interior cavity adjacent the vent opening, the cooling fan being operable to direct ambient air through the vent opening and into the interior cavity, and vent outlets extending through the housing at a location different than a location of the vent opening to promote air circulation through the interior cavity.

17. The stand of claim 12, wherein the housing base and the feet together define a length that is at least 1.5 times greater than a length of the cover.

18. The stand of claim 12, wherein the feet comprise a pair of feet spaced apart to define a seat gap therebetween, and wherein a foot cover is removably coupled to the pair of feet above the seat gap.

19. A method of assembling an electronic gaming system including an electronic gaming machine (EGM) and a stand, the EGM including a cabinet having a cabinet base defining a notch therein, and a stand including a housing defining an interior cavity, the housing including a housing cover, the housing having a housing base and feet coupled to the housing base, the feet extending outward from the housing base such that the housing base and the feet together define a length that is greater than a length of the cover, the method comprising:

coupling a keeper bracket to the housing cover;

positioning the cabinet on the housing cover; and inserting the keeper bracket into the notch to align the cabinet on the housing cover and restrain against tipping of the EGM relative to the stand.

20. The method of claim 19, further comprising:

positioning a game controller within the cabinet;

positioning one or more electronic gaming components in the interior cavity; and communicatively coupling the game controller and the one or more electronic gaming components via communication wiring that is run between the interior cavity and the cabinet.

* * * * *